United States Patent
Hughes

(10) Patent No.: US 12,055,050 B2
(45) Date of Patent: Aug. 6, 2024

(54) VARIABLE GEOMETRY TURBINE

(71) Applicant: Cummins Ltd., London (GB)

(72) Inventor: Stephen David Hughes, Huddersfield (GB)

(73) Assignee: CUMMINS LTD, London (GB)

( * ) Notice: Subject to any disclaimer, the term of this patent is extended or adjusted under 35 U.S.C. 154(b) by 0 days.

(21) Appl. No.: 17/802,851

(22) PCT Filed: Feb. 26, 2021

(86) PCT No.: PCT/GB2021/050506
§ 371 (c)(1),
(2) Date: Aug. 26, 2022

(87) PCT Pub. No.: WO2021/171043
PCT Pub. Date: Sep. 2, 2021

(65) Prior Publication Data
US 2023/0107736 A1 Apr. 6, 2023

(30) Foreign Application Priority Data
Feb. 28, 2020 (GB) .................................... 2002924

(51) Int. Cl.
*F01D 17/16* (2006.01)
*F01D 5/14* (2006.01)
*F01D 17/14* (2006.01)

(52) U.S. Cl.
CPC .............. *F01D 17/16* (2013.01); *F01D 5/141* (2013.01); *F01D 17/14* (2013.01); *F05D 2220/40* (2013.01); *F05D 2240/12* (2013.01); *F05D 2260/60* (2013.01); *F05D 2260/81* (2013.01)

(58) Field of Classification Search
CPC .......... F01D 17/16; F01D 5/141; F01D 17/14; F01D 17/165; F01D 17/143; F01D 17/167; F05D 2220/40; F05D 2240/12; F05D 2260/60; F05D 2260/81; Y02T 10/12
See application file for complete search history.

(56) References Cited

U.S. PATENT DOCUMENTS

| | | | |
|---|---|---|---|
| 6,694,733 B1 * | 2/2004 | Bernardini | F02C 6/12 417/407 |
| 6,854,272 B2 | 2/2005 | Finger | |
| 7,255,530 B2 | 8/2007 | Vogiatzis | |
| 8,109,715 B2 | 2/2012 | Renaud | |

(Continued)

FOREIGN PATENT DOCUMENTS

| | | |
|---|---|---|
| DE | 4218229 C1 | 3/1993 |
| EP | 3112608 A1 | 1/2017 |

(Continued)

OTHER PUBLICATIONS

International Preliminary Report on Patentability for International patent application No. PCT/GB2021/050506, filed Feb. 26, 2021, mailed Aug. 30, 2022.

(Continued)

*Primary Examiner* — Jesse S Bogue
(74) *Attorney, Agent, or Firm* — Faegre Drinker Biddle & Reath LLP

(57) ABSTRACT

Variable geometry turbines having new configurations of vanes are disclosed. New methods for designing new configurations of vanes for geometry turbines having are also disclosed.

19 Claims, 15 Drawing Sheets

(56) References Cited

U.S. PATENT DOCUMENTS

| | | | |
|---|---|---|---|
| 8,601,812 B2 | 12/2013 | Parker | |
| 8,857,178 B2 | 10/2014 | O'Hara | |
| 9,488,065 B2 * | 11/2016 | Olmstead | F01D 17/167 |
| 9,664,193 B2 * | 5/2017 | Fledersbacher | F04D 17/08 |
| 9,890,700 B2 * | 2/2018 | Sun | F01D 17/165 |
| 9,932,843 B2 | 4/2018 | Narehood | |
| 11,371,369 B2 * | 6/2022 | Edwards | F01D 9/04 |
| 11,441,435 B2 * | 9/2022 | Moore | F01D 9/041 |
| 2009/0104023 A1 | 4/2009 | Favray | |
| 2009/0246003 A1 | 10/2009 | Roberts | |
| 2015/0086396 A1 | 3/2015 | Nasir | |
| 2023/0098102 A1 | 3/2023 | Hughes | |

FOREIGN PATENT DOCUMENTS

| | | | | |
|---|---|---|---|---|
| GB | 1138941 A | 1/1969 | | |
| GB | 2555872 A | 5/2018 | | |
| WO | WO-2018091871 A1 * | 5/2018 | | F01D 17/143 |

OTHER PUBLICATIONS

International Preliminary Report on Patentability received for PCT Patent Application No. PCT/GB2021/050506, mailed on Sep. 9, 2022, 13 pages.

International Search Report and Written Opinion for International patent application No. PCT/GB2021/050506, filed Feb. 26, 2021, mailed Aug. 2, 2021.

* cited by examiner

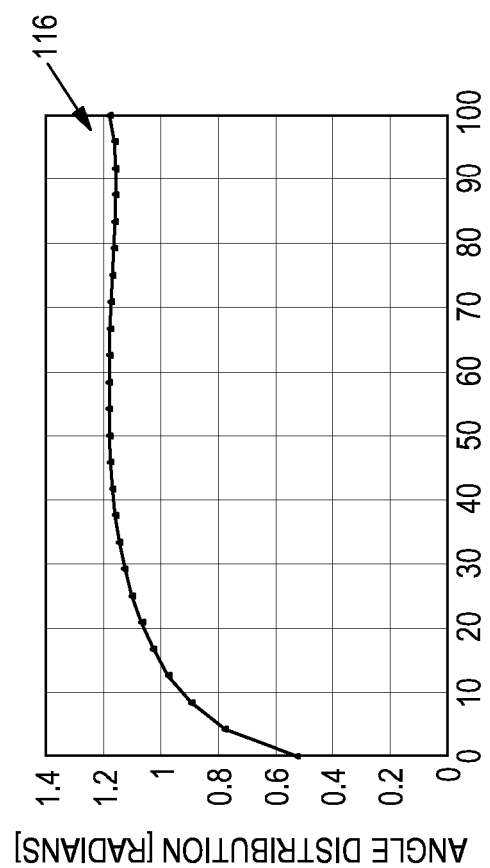
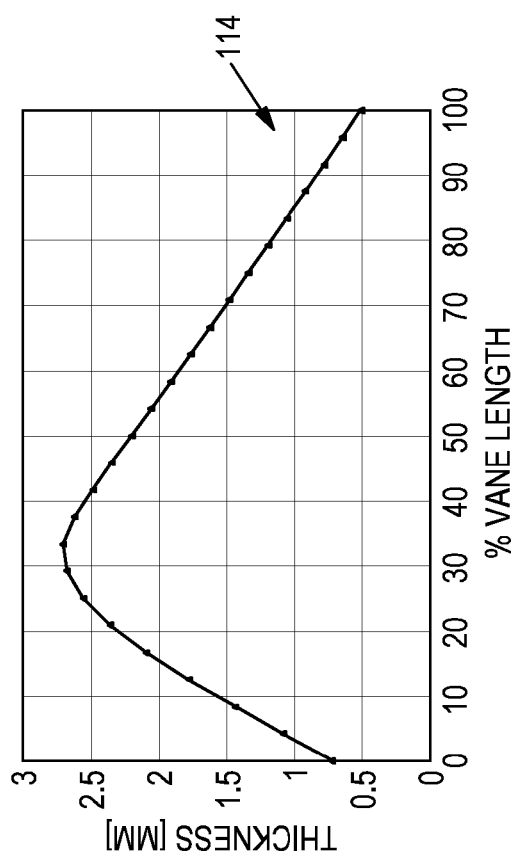
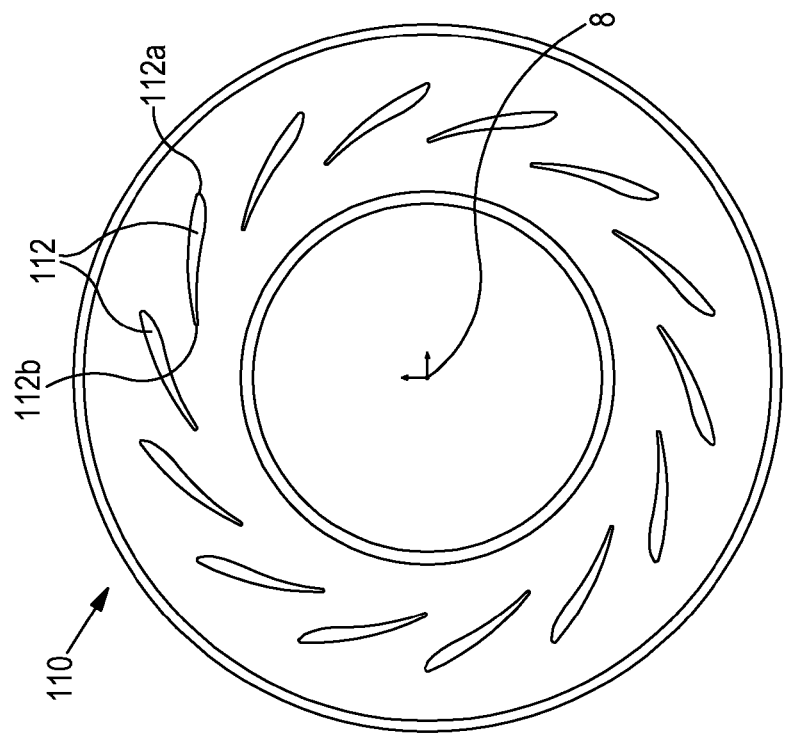

V14 (design)

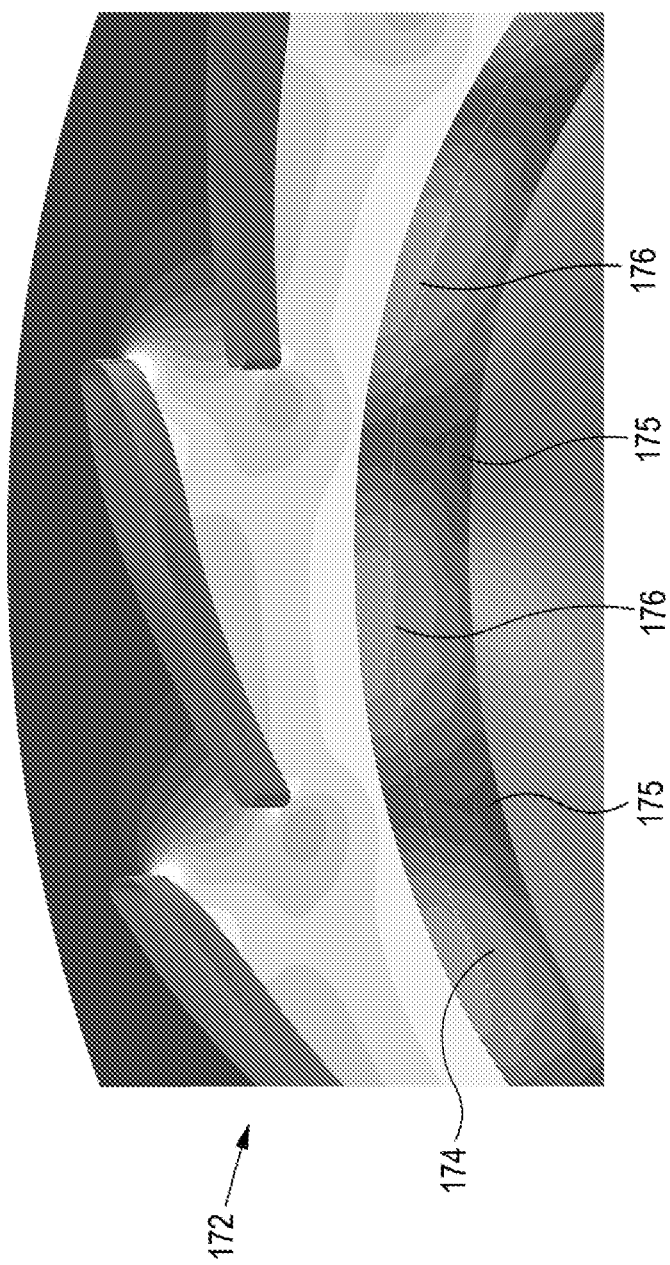

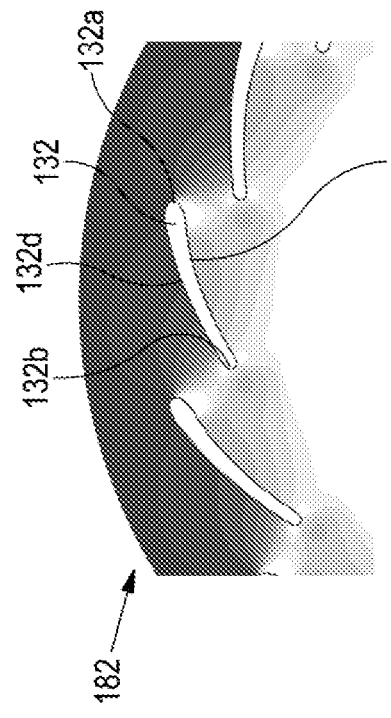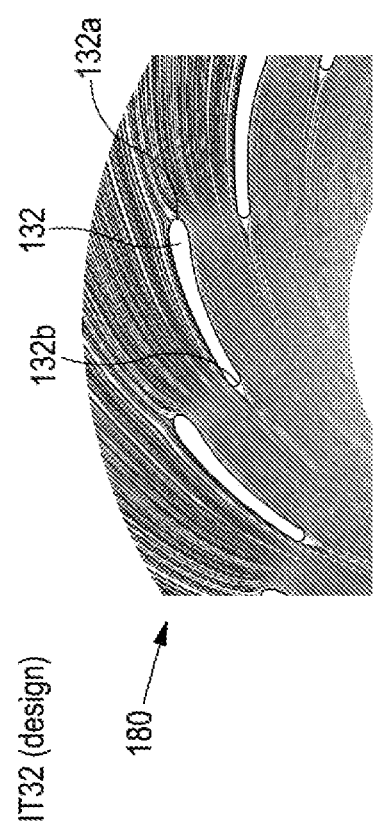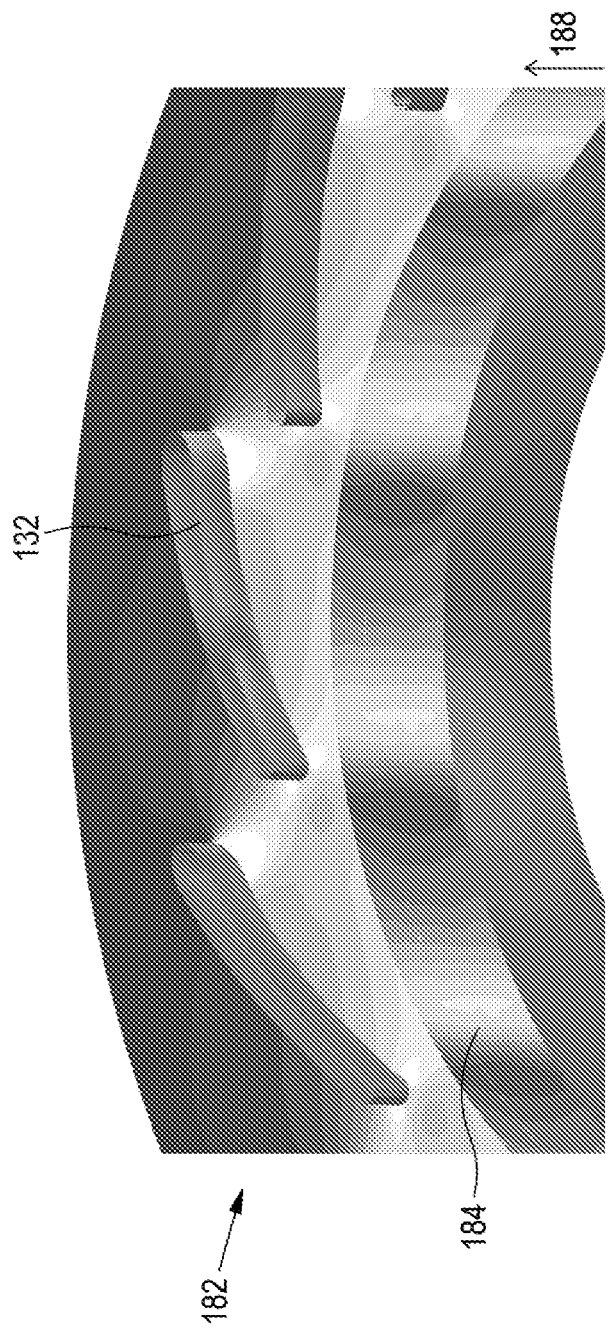
Fig. 12A
Fig. 12B
Fig. 12C

IT32 (off design)

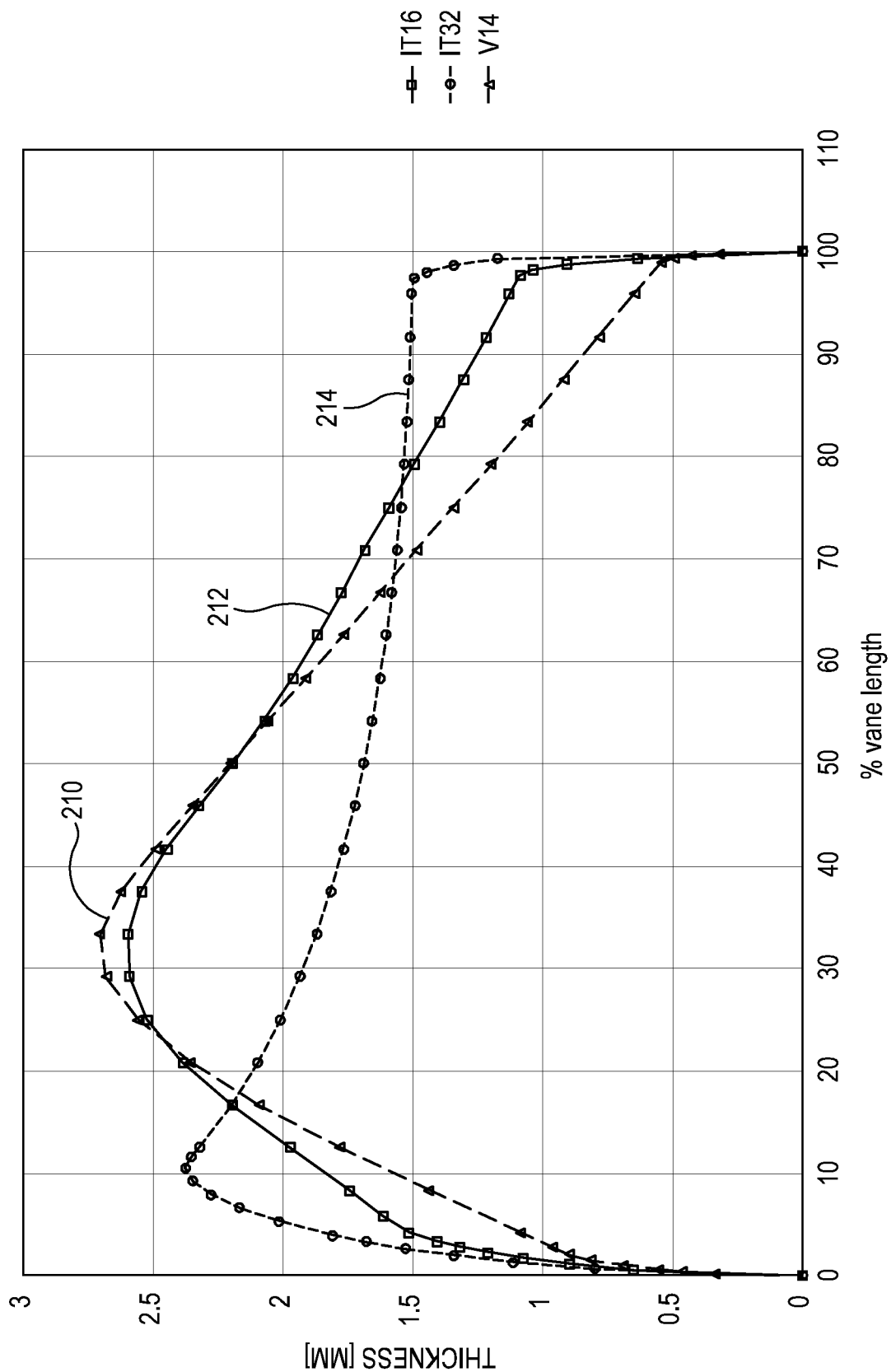

VARIABLE GEOMETRY TURBINE

CROSS-REFERENCE TO RELATED APPLICATIONS

This application claims priority to International Patent Application No. PCT/GB2021/050506, filed Feb. 26, 2021, which claims priority to GB Patent Application No. 2002924.5, filed Feb. 28, 2020, the disclosures of which are hereby expressly incorporated by reference in their entirety.

FIELD

The present disclosure relates to a variable geometry turbine, particularly, but not exclusively, for use in a turbocharger of an internal combustion engine.

BACKGROUND

Turbochargers are known devices for supplying air to the intake of an internal combustion engine at pressures above atmospheric pressure (boost pressures). A conventional turbocharger includes an exhaust gas driven turbine wheel mounted on a rotatable shaft within a turbine housing. Rotation of the turbine wheel rotates a compressor wheel that is mounted on the other end of the shaft and within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housings.

In known turbochargers, the turbine includes a turbine chamber within which the turbine wheel is mounted, an inlet passageway defined between facing radial walls arranged around the turbine chamber, an inlet volute arranged around the inlet passageway, and an outlet passageway extending from the turbine chamber. The passageways and chambers communicate in such a way that pressurised exhaust gas admitted to the inlet volute flows through the inlet passageway to the outlet passageway via the turbine and rotates the turbine wheel. It is also known to trim turbine performance by providing vanes, referred to as nozzle vanes, in the inlet passageway so as to deflect gas flowing through the inlet passageway towards the direction of rotation of the turbine wheel.

Turbines may be of a fixed or variable geometry type. Variable geometry turbines differ from fixed geometry turbines in that the size of the inlet passageway can be varied to optimise gas flow velocities over a range of mass flow rates so that the power output of the turbine can be varied to suit varying engine demands. For instance, when the volume of exhaust gas being delivered to the turbine is relatively low, the velocity of the gas reaching the turbine wheel is maintained at a level that ensures efficient turbine operation by reducing the size of the inlet passageway.

In one known type of variable geometry turbine, an axially movable wall member, generally referred to as a "nozzle ring", defines one wall of the inlet passageway. Hereinafter, the term "nozzle ring" may be used interchangeably with the phrase "movable wall member". The position of the nozzle ring relative to a facing wall of the inlet passageway is adjustable to control the axial width of the inlet passageway. Thus, for example, as gas flowing through the turbine decreases, the inlet passageway width may also be decreased to maintain gas velocity and to optimise turbine output. Such nozzle rings include a generally annular wall and inner and outer axially extending flanges. The flanges extend into a cavity defined in the turbine housing, which is a part of the housing that in practice is provided by the bearing housing, which accommodates axial movement of the nozzle ring.

The nozzle ring may be provided with vanes that extend into the inlet passageway and through slots provided on the facing wall of the inlet passageway to accommodate movement of the nozzle ring. Alternatively, vanes may extend from the fixed wall through slots provided in the nozzle ring. Generally the nozzle ring is supported on rods extending parallel to the axis of rotation of the turbine wheel and is moved by an actuator that axially displaces the rods. Various forms of actuators are known for use in variable geometry turbines, including pneumatic, hydraulic and electric actuators that are mounted externally of the turbocharger and connected to the variable geometry system via appropriate linkages.

It may be desirable to provide a variable geometry turbine at least partially addresses one or more problems associated with known variable geometry turbines, whether identified herein or otherwise.

SUMMARY

According to a first aspect of the present disclosure there is provided a variable geometry turbine comprising: a turbine housing defining an inlet and an outlet; a turbine wheel rotatably mounted in the turbine housing between the inlet and the outlet such that the turbine wheel can rotate about an axis; a movable wall member mounted in the housing so as to be movable relative to the housing between at least a first position and a second position, the movable wall member partially defining an inlet passageway between the inlet and the turbine wheel, the inlet passageway being radially outboard of the turbine wheel, a dimension of the inlet passageway being dependent on the position of the movable wall member relative to the housing; and a plurality of vanes extending across the inlet passageway, the vanes being circumferentially spaced; wherein in cross section each of the vanes has an elongate shape extending from a leading edge which is closer to the inlet to a trailing edge which is closer to the turbine wheel and wherein a perpendicular thickness of the vane 5% along the length of the vane from the leading edge is at least 50% of the maximum perpendicular thickness of the vane.

It will be appreciated that as used here the perpendicular thickness of the vane is intended to mean the thickness perpendicular to a camber line of the vane.

The variable geometry turbine according to this aspect of the disclosure has vanes which have more bulbous leading edges, and which may have larger radii of curvature, than the vanes typically used in such variable geometry turbines. This is advantageous over existing designs, as now discussed.

The use of such a bulbous or blunt leading edge is contrary to the existing teaching in the art, which would prompt the skilled person to select a smaller thickness at the leading edge or the vanes in order to achieve better separation of the flow over the vanes (in turn, increasing the efficiency of the turbine). However, the inventors have realized that for a variable geometry turbine, the angle of attack of the flow of fluid over the vanes is dependent on the position of the movable wall member. The inlet passageway between the inlet and the turbine wheel is partially defined by the movable wall member and may also be partially defined by a second wall member (which may, for example, be fixed relative to the housing or integral therewith). The position of the movable wall member may be characterized by a distance between the movable wall member and the second wall member. This distance may be referred to as a variable geometry gap, or "VG gap".

By increasing the thickness at the leading edge such that a perpendicular thickness of the vane 5% along the length of the vane from the leading edge is at least 50% of the maximum perpendicular thickness of the vane, the variable geometry turbine according to this aspect of the disclosure will operate with a relatively high efficiency over a larger range of angles of attack (and therefore, equivalently, over a larger range of positions of the movable wall member or VG gaps). Whereas prior art turbines may be very efficient for a particular position of the movable wall member and very inefficient at other positions of the movable wall member, the variable geometry turbine according to this aspect of the disclosure can operate with a relatively high efficiency over a significantly larger range of positions of the movable wall member.

Typically, it may be intended for a variable geometry turbine to operate at a particular design configuration (or design point) and convention wisdom would suggest that the vanes be arranged to maximize the efficiency of the turbine under these conditions. For example, a variable geometry turbine may be optimized for a flush gap arrangement wherein the VG gap substantially matches a width of a leading edge (or tip) of the turbine wheel.

Although the variable geometry turbine may operate at the design configuration for the majority of the time, the variable geometry will also operate at other VG gaps. The inventors have realized that with prior art arrangements, whilst being the most efficient (time-averaged) arrangement, the efficiency at some other configurations that are far from the design configuration could be significantly smaller. Perhaps more importantly, the inventors have realized that with prior art arrangements some off design configurations large static pressure fluctuations can be induced at the leading edge of the turbine wheel, which can increase high cycle fatigue to the detriment of the lifetime of the variable geometry turbine. This is addressed by the variable geometry turbine according to this aspect of the disclosure.

The perpendicular thickness of the vane 5% along the length of the vane from the leading edge may be at least 55% of the maximum perpendicular thickness of the vane. The perpendicular thickness of the vane 5% along the length of the vane from the leading edge is at least 60% of the maximum perpendicular thickness of the vane. In some embodiments, the perpendicular thickness of the vane 5% along the length of the vane from the leading edge may be at least 70% of the maximum perpendicular thickness of the vane or even 80% of the maximum perpendicular thickness of the vane.

A perpendicular thickness of the vane 95% along the length of the vane from the leading edge may be at least 40% of the maximum perpendicular thickness of the vane.

Advantageously, such an arrangement increases the foreign object damage (FOD) tolerance of the vanes.

The perpendicular thickness of the vane 95% along the length of the vane from the leading edge may be at least 45% of the maximum perpendicular thickness of the vane. The perpendicular thickness of the vane 95% along the length of the vane from the leading edge may be at least 50% of the maximum perpendicular thickness of the vane. The perpendicular thickness of the vane 95% along the length of the vane from the leading edge may be at least 55% of the maximum perpendicular thickness of the vane. The perpendicular thickness of the vane 95% along the length of the vane from the leading edge may be at least 60% of the maximum perpendicular thickness of the vane.

The vanes and the turbine wheel may be arranged such that a ratio of a radius of the trailing edge of each of the vanes to a radius of a leading edge of the turbine wheel is 1.2 or greater.

The ratio of the radius of the trailing edge of each of the vanes to the radius of the leading edge of the turbine wheel may be in the range 1.2 to 1.25.

Whilst increasing the foreign object damage (FOD) tolerance of the vanes, increasing the dimension at the trailing edge (for example such that a perpendicular thickness of the vane 95% along the length of the vane from the leading edge is at least 40% of the maximum perpendicular thickness of the vane) can increase the length of the wake formed downstream of each vane. Advantageously, increasing the ratio of the radius of the trailing edge of each of the vanes to the radius of the leading edge of the turbine wheel to 1.2 or greater may allow this wake to dissipate sufficiently so as to reduce the forcing function at a tip of the turbine wheel.

The vanes and the turbine wheel may be arranged such that a ratio of a radius of the leading edge of each of the vanes to a radius of the trailing edge of each of the vanes is 1.2 or greater.

The vanes and the turbine wheel may be arranged such that a ratio of a solidity ratio of the vanes in in the range 1.1 to 1.3.

The ratio of the length of the passageway defined between each pair of adjacent vanes to the width of said passageway may be referred to as the solidity ratio. A higher solidity ratio results in a larger vane overlap. In turn, this results in increases control over the flow between adjacent vanes.

The leading edge of the vanes may be provided with an elliptical end treatment having a ratio of the major axis to the minor axis of at least 1.5.

The elliptical end treatment may have a ratio of the major axis to the minor axis of 1.5. Alternatively, the elliptical end treatment may have a ratio of the major axis to the minor axis of 2.0.

The vanes may be arranged so as to produce a double wake variation in the static pressure around a circumference of the turbine wheel.

The static pressure trace around a circumference of the turbine at the trailing edge of each of the vanes may be referred to as the forcing function. Naively, one may expect the forcing function to have some areas of low pressure corresponding to the wake of each vane interspersed by areas of high pressure corresponding to the flow of fluid through the passageway defined between each pair of adjacent vanes. That is, one may expect the forcing function to be dominated by a Fourier component that corresponds to the number of the plurality of vanes (which may be referred to as a vane order oscillation).

Whilst increasing the foreign object damage (FOD) tolerance of the vanes, increasing the dimensions of the trailing edge of the vanes can increase the length of the wake formed downstream of each vane.

Shaping the vanes such that each vane produces a double wake in the forcing function reduces the overall amplitude of the forcing function. Advantageously, this can reduce the overall magnitude of the forcing function sufficiently such that even if the wake of the vanes has not fully dissipated the forcing function may be at an acceptably low level.

The vanes may have a shape at least partially defined by a thickness distribution that exponentially reduces from the leading edge to the trailing edge and having an end treatment at each of the leading and trailing edges.

Such a thickness distribution may induce a double wake. The thickness distribution may be the thickness distribution in Table 7. The actual thickness of the vanes, with the end treatment at each of the leading and trailing edges, may be the thickness distribution in Table 14.

The vanes may have a shape at least partially defined by an angular distribution that is more tangential at the leading edge than the trailing edge.

Such an angular distribution may aid in the induction of a double wake. The angular distribution may be the angular distribution in Table 8.

According to a second aspect of the disclosure there is provided a variable geometry turbine comprising: a turbine housing defining an inlet and an outlet; a turbine wheel rotatably mounted in the turbine housing between the inlet and the outlet such that the turbine wheel can rotate about an axis; a movable wall member mounted in the housing so as to be movable relative to the housing between at least a first position and a second position, the movable wall member partially defining an inlet passageway between the inlet and the turbine wheel, the inlet passageway being radially outboard of the turbine wheel, a dimension of the inlet passageway being dependent on the position of the movable wall member relative to the housing; and a plurality of vanes extending across the inlet passageway, the vanes being circumferentially spaced; wherein in cross section each of the vanes has an elongate shape extending from a leading edge which is closer to the inlet to a trailing edge which is closer to the turbine wheel and wherein a perpendicular thickness of the vane 95% along the length of the vane from the leading edge is at least 40% of the maximum perpendicular thickness of the vane; and wherein the vanes and the turbine wheel are arranged such that a ratio of a radius of the trailing edge of each of the vanes to a radius of a leading edge of the turbine wheel is 1.2 or greater.

Advantageously, increasing a dimension of the trailing edge of each of the vanes such that a perpendicular thickness of the vane 95% along the length of the vane from the leading edge is at least 40% of the maximum perpendicular thickness of the vane increases the foreign object damage tolerance of the vanes. Whilst increasing the foreign object damage (FOD) tolerance of the vanes, increasing the dimension of the trailing edge can increase the length of the wake formed downstream of each vane. However, advantageously, increasing the ratio of the radius of the trailing edge of each of the vanes to the radius of the leading edge of the turbine wheel to 1.2 or greater may allow this wake to dissipate sufficiently so as to reduce the forcing function at a tip of the turbine wheel.

The perpendicular thickness of the vane 95% along the length of the vane from the leading edge may be at least 45% of the maximum perpendicular thickness of the vane. The perpendicular thickness of the vane 95% along the length of the vane from the leading edge may be at least 50% of the maximum perpendicular thickness of the vane. The perpendicular thickness of the vane 95% along the length of the vane from the leading edge may be at least 55% of the maximum perpendicular thickness of the vane. The perpendicular thickness of the vane 95% along the length of the vane from the leading edge may be at least 60% of the maximum perpendicular thickness of the vane.

A perpendicular thickness of the vane 5% along the length of the vane from the leading edge may be at least 50% of the maximum perpendicular thickness of the vane.

The use of such a bulbous or blunt leading edge provides increased tolerance to different angles of attack and can reduce the forcing function.

The ratio of the radius of the trailing edge of each of the vanes to the radius of the leading edge of the turbine wheel may be in the range 1.2 to 1.25.

The vanes and the turbine wheel may be arranged such that a ratio of a radius of the leading edge of each of the vanes to a radius of the trailing edge of each of the vanes is 1.2 or greater.

The vanes and the turbine wheel may be arranged such that a ratio of a solidity ratio of the vanes in in the range 1.1 to 1.3.

The ratio of the length of the passageway defined between each pair of adjacent vanes to the width of said passageway may be referred to as the solidity ratio. A higher solidity ratio results in a larger vane overlap. In turn, this results in increases control over the flow between adjacent vanes.

The leading edge of the vanes may be provided with an elliptical end treatment having a ratio of the major axis to the minor axis of at least 1.5.

The elliptical end treatment may have a ratio of the major axis to the minor axis of 1.5. Alternatively, the elliptical end treatment may have a ratio of the major axis to the minor axis of 2.0.

According to a third aspect of the disclosure there is provided a variable geometry turbine comprising: a turbine housing defining an inlet and an outlet; a turbine wheel rotatably mounted in the turbine housing between the inlet and the outlet such that the turbine wheel can rotate about an axis; a movable wall member mounted in the housing so as to be movable relative to the housing between at least a first position and a second position, the movable wall member partially defining an inlet passageway between the inlet and the turbine wheel, the inlet passageway being radially outboard of the turbine wheel, a dimension of the inlet passageway being dependent on the position of the movable wall member relative to the housing; and a plurality of vanes extending across the inlet passageway, the vanes being circumferentially spaced; wherein in cross section each of the vanes has an elongate shape extending from a leading edge which is closer to the inlet to a trailing edge which is closer to the turbine wheel and wherein the vanes are arranged so as to produce a double wake variation in the static pressure around a circumference of the turbine wheel.

The static pressure trace around a circumference of the turbine at the trailing edge of each of the vanes may be referred to as the forcing function. Naively, one may expect the forcing function to have some areas of low pressure corresponding to the wake of each vane interspersed by areas of high pressure corresponding to the flow of fluid through the passageway defined between each pair of adjacent vanes. That is, one may expect the forcing function to be dominated by a Fourier component that corresponds to the number of the plurality of vanes (which may be referred to as a vane order oscillation).

Whilst increasing the foreign object damage (FOD) tolerance of the vanes, increasing the dimensions of the trailing edge of the vanes can increase the length of the wake formed downstream of each vane.

Shaping the vanes such that each vane produces a double wake in the forcing function reduces the overall amplitude of the forcing function. Advantageously, this can reduce the overall magnitude of the forcing function sufficiently such that even if the wake of the vanes has not fully dissipated the forcing function may be at an acceptably low level.

The vanes may have a shape at least partially defined by a thickness distribution that exponentially reduces from the leading edge to the trailing edge and having an end treatment at each of the leading and trailing edges.

Such a thickness distribution may induce a double wake. The thickness distribution may be the thickness distribution in Table 7. The actual thickness of the vanes, with the end treatment at each of the leading and trailing edges, may be the thickness distribution in Table 14.

The vanes may have a shape at least partially defined by an angular distribution that is more tangential at the leading edge than the trailing edge.

Such an angular distribution may aid in the induction of a double wake. The angular distribution may be the angular distribution in Table 8.

According to a fourth aspect of the disclosure there is provided a variable geometry turbine comprising: a turbine housing defining an inlet and an outlet; a turbine wheel rotatably mounted in the turbine housing between the inlet and the outlet such that the turbine wheel can rotate about an axis; a movable wall member mounted in the housing so as to be movable relative to the housing between at least a first position and a second position, the movable wall member partially defining an inlet passageway between the inlet and the turbine wheel, the inlet passageway being radially outboard of the turbine wheel, a dimension of the inlet passageway being dependent on the position of the movable wall member relative to the housing; and a plurality of vanes extending across the inlet passageway, the vanes being circumferentially spaced; wherein in cross section each of the vanes has an elongate shape extending from a leading edge which is closer to the inlet to a trailing edge which is closer to the turbine wheel and wherein the vanes have a shape at least partially defined by a thickness distribution that exponentially reduces from the leading edge to the trailing edge and having an end treatment at each of the leading and trailing edges.

The thickness distribution may be the thickness distribution in Table 7. The actual thickness of the vanes, with the end treatment at each of the leading and trailing edges, may be the thickness distribution in Table 14.

The vanes may have a shape at least partially defined by an angular distribution that is more tangential at the leading edge than the trailing edge.

The angular distribution may be the angular distribution in Table 8.

According to a fifth aspect of the disclosure there is provided a variable geometry turbine comprising: a turbine housing defining an inlet and an outlet; a turbine wheel rotatably mounted in the turbine housing between the inlet and the outlet such that the turbine wheel can rotate about an axis; a movable wall member mounted in the housing so as to be movable relative to the housing between at least a first position and a second position, the movable wall member partially defining an inlet passageway between the inlet and the turbine wheel, the inlet passageway being radially outboard of the turbine wheel, a dimension of the inlet passageway being dependent on the position of the movable wall member relative to the housing; and a plurality of vanes extending across the inlet passageway, the vanes being circumferentially spaced; wherein in cross section each of the vanes has an elongate shape extending from a leading edge which is closer to the inlet to a trailing edge which is closer to the turbine wheel and wherein the vanes have a shape defined by the curves in Tables 9, 10, 11 and 12 multiplied by a scale factor.

The scale factor may be 1. Alternatively the scale factor may be less than or greater than 1.

It will be appreciated that the four curves given in Tables 9 to 12 define a shape and position of a single vane in a plane perpendicular to the axis. It will be appreciated that for the plurality of vanes to have a shape defined by the curves in Tables 9, 10, 11 and 12, all of the vanes have the shape as defined by the four curves given in Tables 9 to 12 but, in general, are disposed at different positions with respect to the axis. The vanes may be arranged evenly around the axis. The variable geometry turbine may comprise 14 vanes. Therefore, the positions of all the vanes may be given by rotating the x-y co-ordinates of the four curves given in Tables 9 to 12 about the origin by n·360/14 degrees, where n is an integer between 1 and 14 inclusive.

According to a sixth aspect of the disclosure there is provided a variable geometry turbine comprising: a turbine housing defining an inlet and an outlet; a turbine wheel rotatably mounted in the turbine housing between the inlet and the outlet such that the turbine wheel can rotate about an axis; a movable wall member mounted in the housing so as to be movable relative to the housing between at least a first position and a second position, the movable wall member partially defining an inlet passageway between the inlet and the turbine wheel, the inlet passageway being radially outboard of the turbine wheel, a dimension of the inlet passageway being dependent on the position of the movable wall member relative to the housing; and a plurality of vanes extending across the inlet passageway, the vanes being circumferentially spaced; wherein in cross section each of the vanes has an elongate shape extending from a leading edge which is closer to the inlet to a trailing edge which is closer to the turbine wheel and wherein the vanes have a shape at least partially defined by the thickness distribution in Table 1 and the angular distribution in Table 2.

The actual thickness of the vanes, with an end treatment at each of the leading and trailing edges, may be the thickness distribution in Table 13.

According to a seventh aspect of the disclosure there is provided variable geometry turbine comprising: a turbine housing defining an inlet and an outlet; a turbine wheel rotatably mounted in the turbine housing between the inlet and the outlet such that the turbine wheel can rotate about an axis; a movable wall member mounted in the housing so as to be movable relative to the housing between at least a first position and a second position, the movable wall member partially defining an inlet passageway between the inlet and the turbine wheel, the inlet passageway being radially outboard of the turbine wheel, a dimension of the inlet passageway being dependent on the position of the movable wall member relative to the housing; and a plurality of vanes extending across the inlet passageway, the vanes being circumferentially spaced; wherein in cross section each of the vanes has an elongate shape extending from a leading edge which is closer to the inlet to a trailing edge which is closer to the turbine wheel and wherein the vanes have a shape defined by the curves in Tables 3, 4, 5 and 6 multiplied by a scale factor.

The scale factor may be 1. Alternatively the scale factor may be less than or greater than 1.

It will be appreciated that the four curves given in Tables 3 to 6 define a shape and position of a single vane in a plane perpendicular to the axis. It will be appreciated that for the plurality of vanes to have a shape defined by the curves in Tables 3, 4, 5 and 6, all of the vanes have the shape as defined by the four curves given in Tables 3 to 6 but, in general, are disposed at different positions with respect to the axis. The vanes may be arranged evenly around the axis. The variable geometry turbine may comprise 14 vanes. Therefore, the positions of all the vanes may be given by rotating the x-y co-ordinates of the four curves given in Tables 3 to 6 about the origin by n·360/14 degrees, where n is an integer between 1 and 14 inclusive.

According to an eighth aspect of the disclosure there is provided a movable wall member for use in the variable geometry turbine of any of the first, second, third, fourth, fifth, sixth or seventh aspects of the disclosure.

According to an ninth aspect of the disclosure there is provided a method for designing the vanes for a variable geometry turbine, the method comprising: selecting a thickness distribution; and applying an edge treatment to each of the leading edge and trailing edge, the edge treatment for the leading edge being elliptical in cross-section, having a ratio between the minor and major lengths of 1.5 or more; such that a perpendicular thickness of the resultant vane 5% along the length of the vane from the leading edge is at least 50% of the maximum perpendicular thickness of the vane.

Optionally, the method may further comprise: selecting a radius of the trailing edge of the vanes such that a ratio of the radius of the trailing edge of the vanes to a radius of a leading edge of the turbine wheel is within the range 1.2 to 1.25.

Optionally, the method may further comprise: selecting an outer diameter of the vane leading edge such that the ratio of the radius of the leading edge of the vanes to the radius of the trailing edge of the vanes is 1.2.

Optionally, the selection of the thickness distribution and the application of the edge treatment to each of the leading edge and trailing edge may be such that a perpendicular thickness of the resultant vane 95% along the length of the vane from the leading edge is at least 40% of the maximum perpendicular thickness of the vane.

According to an tenth aspect of the disclosure there is provided a method for designing the vanes for a variable geometry turbine having a turbine wheel, the method comprising: selecting a radius of the trailing edge of the vanes such that a ratio of the radius of the trailing edge of the vanes to a radius of a leading edge of the turbine wheel is within the range 1.2 to 1.25; and selecting an outer diameter of the vane leading edge such that the ratio of the radius of the leading edge of the vanes to the radius of the trailing edge of the vanes is 1.2.

According to an eleventh aspect of the disclosure there is provided a method for designing the vanes for a variable geometry turbine having a turbine wheel, the method comprising: selecting a thickness distribution of the vanes to provide a rapid reduction in vane thickness between the leading and trailing edges.

The method may further comprise: selecting an angular distribution of the vanes wherein the angular distribution is more tangential at the leading edge than at the trailing edge.

It will be appreciated that where appropriate any of the above aspects may incorporate one or more features of any of the other aspects.

BRIEF DESCRIPTION OF THE DRAWINGS

Specific embodiments of the present disclosure will now be described, by way of example, with reference to the accompanying drawings, of which:

FIG. 5A shows an arrangement of vanes designed according to the known method shown in FIG. 2 in a plane perpendicular to the turbocharger axis;

FIG. 5B shows the thickness distribution of the vanes shown in FIG. 5A as a percentage along the length of the vanes;

FIG. 5C shows the angular distribution of the vanes shown in FIG. 5A as a percentage along the length of the vanes;

FIGS. 11A to 11C illustrate the performance of the arrangement of vanes shown in FIG. 6A for an exhaust flow for which the arrangement has not been designed;

FIGS. 12A to 12C illustrate the performance of the arrangement of vanes shown in FIG. 7A for an exhaust flow for which the arrangement has been designed;

FIG. 15 shows the actual thicknesses of the vanes shown in FIGS. 5A, 6A and 7A respectively, as a percentage of the vane length.

DETAILED DESCRIPTION

Figure 1:
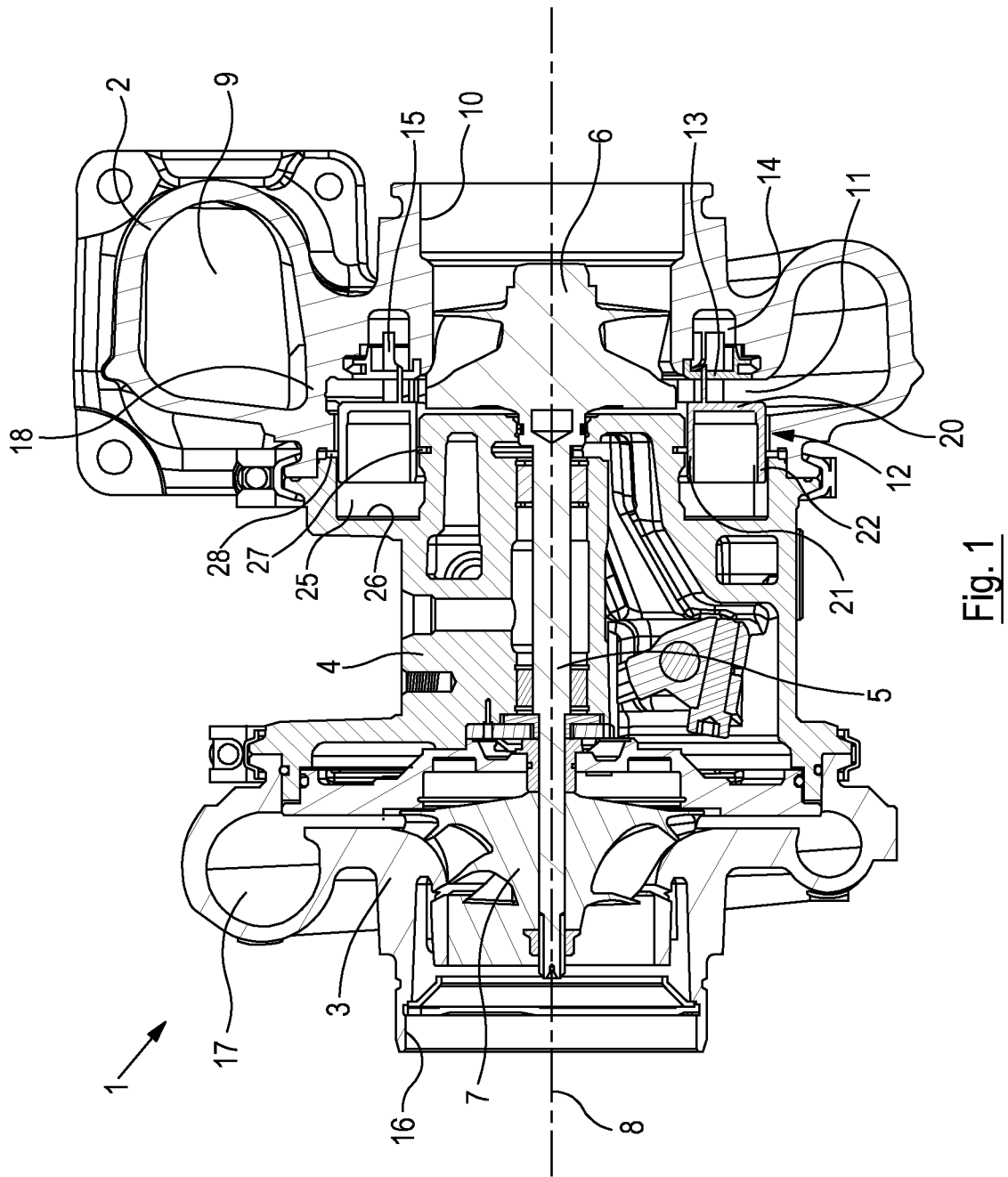
FIG. 1 shows a turbocharger which may incorporate a variable geometry turbine in accordance with an embodiment of the present disclosure.

FIG. 1 shows a turbocharger 1 which may incorporate a variable geometry turbine in accordance with an embodiment of the present disclosure. The turbocharger 1 comprises a turbine housing 2 and a compressor housing 3 interconnected by a central bearing housing 4. A turbocharger shaft 5 extends from the turbine housing 2 to the compressor housing 3 through the bearing housing 4. A turbine wheel 6 is mounted on one end of the shaft 5 for rotation within the turbine housing 2, and a compressor wheel 7 is mounted on the other end of the shaft 5 for rotation within the compressor housing 3. The shaft 5 rotates about turbocharger axis 8 on bearing assemblies located in the bearing housing 4.

It will be appreciated that the turbine housing 2 and an axial end of the bearing housing 4 together form a housing of the variable geometry turbine, in which the turbine wheel 6 is supported for rotation about turbocharger axis 8.

The turbine housing 2 defines an inlet volute 9 to which exhaust gas from an internal combustion engine (not shown) is delivered. The exhaust gas flows from the inlet volute 9 to an axial outlet passage 10 via an inlet passageway 11 and the turbine wheel 6. The inlet passageway 11 is defined between two axially spaced walls. In particular, the inlet passageway 11 is defined on one side by a face of a movable wall member 12, commonly referred to as a "nozzle ring," and on the opposite side by a shroud 13. The shroud 13 covers the opening of a generally annular recess 14 in the turbine housing 2.

As will be appreciated by the skilled person, the inlet volute 9 may comprise a generally toroidal volume (defined by the turbine housing 2) and an inlet arranged to direct exhaust gas from an internal combustion engine tangentially into the generally toroidal volume. As exhaust gas enters the inlet volute 9 it flows circumferentially around the generally toroidal volume and radially inwards towards the inlet passageway 11. In the vicinity of the inlet, there is provided a wall or "tongue" 18 which serves to separate the generally toroidal volume in the vicinity of the inlet of the volute 9 from the inlet passageway 11 of the turbine. The tongue 18 may help to guide the exhaust gas circumferentially around the generally toroidal volume and may also aid the mixing of the generally linear gas flowing into the volute 9 with the circumferential gas flow around the generally toroidal volume. In the cross section shown in FIG. 1, the tongue 18 is visible on one side of the axis 8 only.

The movable wall member 12 supports an array of circumferentially and equally spaced inlet vanes 15 each of which extends across the inlet passageway 11. The vanes 15 are orientated to deflect gas flowing through the inlet passageway 11 towards the direction of rotation of the turbine wheel 6. The shroud 13 is provided with suitably configured slots for receipt of the vanes 15 such that as the movable wall member 12 moves axially towards the shroud 13, a distal end of each of the vanes 15 moves through one of said slots and protrudes into the recess 14.

Accordingly, by appropriate control of the actuator (which may for instance be pneumatic or electric), the axial position of the movable wall member 12 can be controlled. The speed of the turbine wheel 6 is dependent upon the velocity of the gas passing through the inlet passageway 11. For a fixed rate of mass of gas flowing into the inlet passageway 11, the gas velocity is a function of the width of the inlet passageway 11, the width being adjustable by controlling the axial position of the movable wall member 12. As the width of the inlet passageway 11 is reduced, the velocity of the gas passing through it increases. FIG. 1 shows the nozzle ring 12 disposed between a fully open position and a fully closed position such that the width of inlet passageway 11 is greater that a minimum width and smaller than a maximum width.

The (axial) width of the inlet passageway 11 between the movable wall member 12 and the shroud 13 may be referred to as a variable geometry gap or a VG gap.

It will be appreciated that the exhaust gases spiral generally radially inwards through the inlet passageway 11 towards the turbine wheel 6. Accordingly, it will be appreciated that, unless stated otherwise, as used herein the leading edge of a vane 15 shall be understood to be a radially outer end of the vane 15 and the trailing edge of a vane 15 shall be understood to be a radially inner end of the vane 15.

Gas flowing from the inlet volute 9 to the outlet passage 10 passes over the turbine wheel 6 and as a result torque is applied to the shaft 5 to drive the compressor wheel 7. Rotation of the compressor wheel 7 within the compressor housing 3 pressurises ambient air present in an air inlet 16 and delivers the pressurised air to an air outlet volute 17 from which it is fed to an internal combustion engine (not shown).

The movable wall member (or nozzle ring) 12 comprises a generally annular wall 20 and radially inner and outer flanges 21, 22 extending axially from the generally annular wall 20.

A cavity 25 is provided in the housing of the variable geometry turbine for receipt of the radially inner and outer flanges 21, 22 of the movable wall member 12. It will be appreciated that the cavity 25 is formed on an axial end of the bearing housing 4, which cooperates with the turbine housing 2 to form the housing of the variable geometry turbine.

As the movable wall member 12 moves axially, the extent to which the radially inner and outer flanges 21, 22 of the movable wall member 12 are received in the cavity 25 varies. The movable wall member 12 is movable between a fully opened position and a fully closed position. When disposed in the fully opened position, the radially inner and outer flanges 21, 22 of the movable wall member 12 may contact a base surface 26 of the cavity 25. That is, a portion of the base surface 26 of the cavity 25 may serve as a physical stop to limit the range of axial movement of the movable wall member 12.

Inner and outer sealing rings 27, 28 are provided to seal the movable wall member 12 with respect to surfaces of the cavity 25, whilst allowing the movable wall member 12 to slide within the cavity 25. The inner sealing ring 27 is supported within an annular groove formed in a radially inner curved surface of the cavity 25 and bears against the inner flange 21 of the movable wall member 12. The outer sealing ring 28 is supported within an annular groove formed in a radially outer curved surface of the cavity 25 and bears against the outer flange 22 of the movable wall member 12.

In some embodiments a plurality of axially extending apertures may be provided through the generally annular wall 20 of the movable wall member 12. The apertures may be referred to as balancing apertures. The balancing apertures may connect the inlet 11 to the cavity 25, such that the inlet 11 and the cavity 25 are in fluid communication via the apertures. In use, the balancing apertures serve to reduce pressure differences across the generally annular wall 20 of the movable wall member 12 and thereby reduce loads applied to the face of the generally annular wall 20 of the movable wall member 12.

In use, as air flows radially inwards through the turbine inlet 11, it flows between adjacent vanes 15, which can be regarded as defining a vane passage. The turbine inlet 11 has a reduced radial flow area in the region of the vane passage with the effect that the inlet gas speed increases through the vane passage with a corresponding drop in pressure in this region of the movable wall member 12.

Embodiments of the present disclosure relate to variable geometry turbines of the type of turbine shown in FIG. 1 which have new arrangements of inlet vanes 15 which extend across the inlet passageway 11. In particular, embodiments of the present disclosure relate to vanes 15 having new shapes and configurations with respect to known vanes 15. Some embodiments of the present disclosure may relate to a movable wall member 12 (or nozzle ring) or even merely to a vane 15.

As explained further below, some embodiments of the present disclosure relate to vanes 15 having shapes and configurations which would be contrary to prejudices of the skilled person. Some embodiments of the present disclosure relate to new methods for designing arrangements 110 of inlet vanes 15 which extend across the inlet passageway 11 of a variable geometry turbine of the type of turbine shown in FIG. 1.

Some embodiments of the present disclosure relate to new inlet vanes 15 which have a shape and configuration which results in a reduction in the amplitude of azimuthal (static) pressure variations around the circumference of the turbine wheel 6. Such azimuthal pressure variations around the circumference of the turbine wheel 6 may be referred to herein as a forcing function. In particular, some embodiments of the present disclosure relate to new inlet vanes 15 which have a shape and configuration which results in a reduction in the amplitude of azimuthal pressure variations around the circumference of the turbine wheel 6 over a range of different VG gaps. This is beneficial since large pressure fluctuations around the circumference of the turbine wheel 6 (which the blades of the turbine wheel 6 move through) will cause oscillating deformation or vibration of the blades of the turbine wheel 6. In turn, this can lead to high cycle fatigue.

Some embodiments of the present disclosure relate to new inlet vanes 15 which have a larger, more bulbous (or, alternatively, less pointy) leading edge 112a profile with respect to known vanes 15. This is advantageous over existing designs, as now discussed.

The use of such a bulbous or blunt leading edge 112a is contrary to the existing teaching in the art, which would prompt the skilled person to select a smaller radius of curvature at the leading edge or the vanes in order to achieve better separation of the flow over the vanes (in turn, increasing the efficiency of the turbine). However, the inventors of the present disclosure have realized that for a variable geometry turbine, the angle of attack of the flow of fluid over the vanes 112 is dependent on the position of the movable wall member 12 (i.e. the VG gap). By increasing the radius of curvature of the vanes 112 at the leading edge 112a the variable geometry turbines according to some embodiments of the disclosure will operate with a relatively high efficiency over a larger range of angles of attack (and therefore, equivalently, over a larger range of positions of the movable wall member 12 or VG gaps). In addition, the variable geometry turbines according to some embodiments of the disclosure will maintain the amplitude of the forcing function relatively low over a significantly larger range of positions of the movable wall member.

At least some increased tolerance to variation in angle of attack is expected for a vanes having a perpendicular thickness 5% along the length of the vane from the leading edge of at least 50% of the maximum perpendicular thickness of the vane.

Some embodiments of the present disclosure relate to new inlet vanes 15 which have a larger, more bulbous (or, alternatively, less pointy) trailing edge profile with respect to known vanes 15. Advantageously, such an arrangement increases the foreign object damage (FOD) tolerance of the vanes 15.

Some new methods for designing arrangements of inlet vanes 15 which extend across the inlet passageway 11 of a variable geometry turbine of the type of turbine shown in FIG. 1 are now discussed with reference to FIGS. 2 to 4.

In order to better understand the new methods for designing the vanes 15 for a variable geometry turbine of the type of turbine shown in FIG. 1, it is useful to consider the steps of a conventional method or process for designing these vanes 15.

Figure 2:
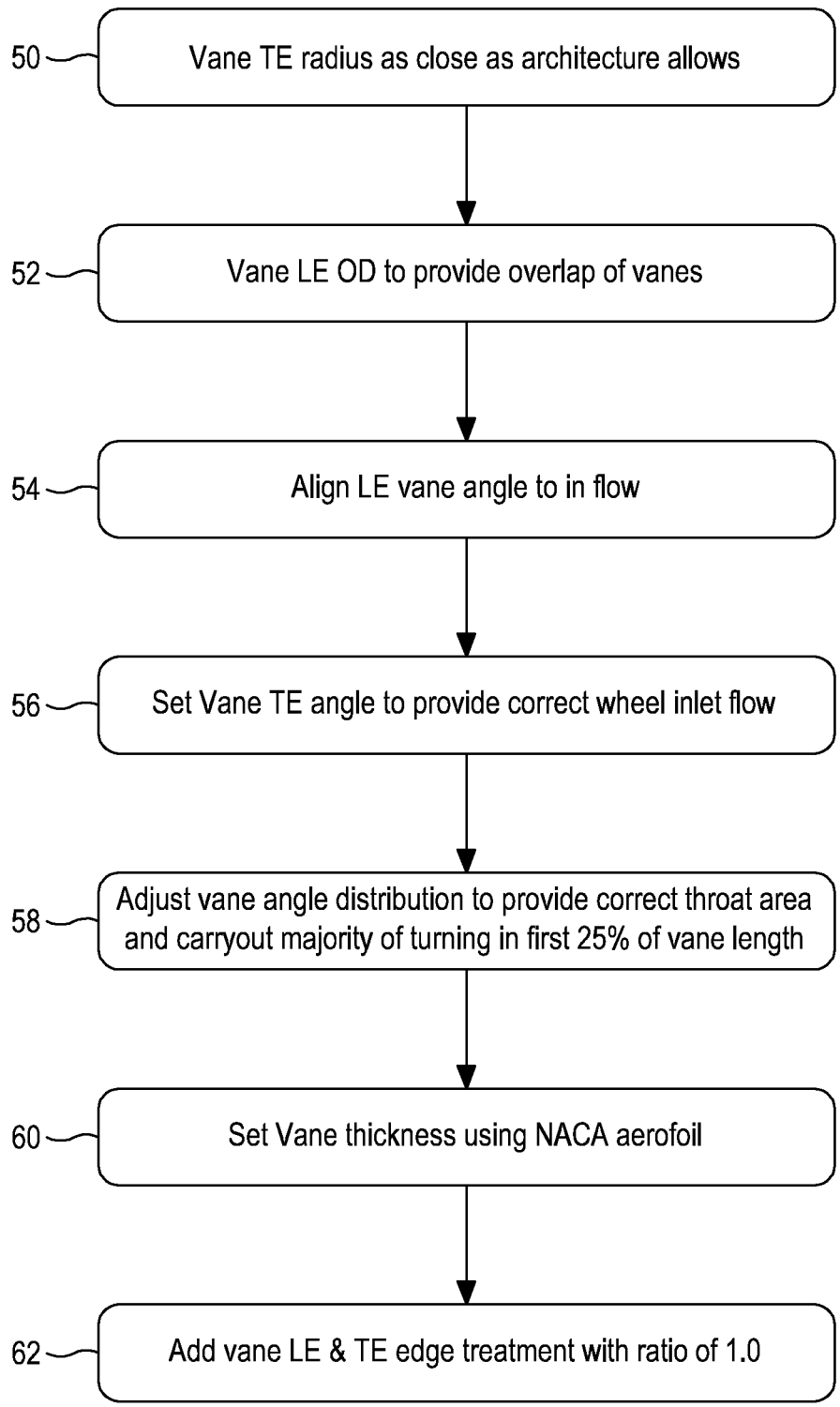
FIG. 2 illustrates the steps of a conventional method or process for designing the vanes for a variable geometry turbine of the type of turbine shown in FIG. 1.

FIG. 2 illustrates the steps of a conventional method or process for designing the vanes 15 for a variable geometry turbine of the type of turbine shown in FIG. 1.

At step 50, the radius of the trailing edge of the vanes 15 is selected so as to place the vanes 15 as close to the tip (or leading edge) of the turbine wheel 6 as the architecture allows. For example a small clearance is provided between the trailing edge of the vanes 15 and the wheel but this clearance is minimised.

At step 52, the outer diameter of the vane leading edge is selected so as to provide some overlap of the vanes. That is, the azimuthal extent of the vanes 15 is such that the leading edge of one vane will overlap slightly in an azimuthal direction with the trailing edge of an adjacent vane.

At step 54, an angle of the leading edge of the vane is selected so as to align with the expected angle of flow into the nozzle ring 12.

At step 56, an angle of the trailing edge of the vane is selected so as to provide the correct wheel inlet flow for the turbine wheel 6.

At step 58, a vane angle distribution is selected to provide a target throat area and to perform the majority of turning of the fluid in first 25% of the vane length. The target throat area is selected in order to achieve a target mass flow range. In turn, this target mass flow is selected to maximise the efficiency of the turbine.

At step 60, a vane thickness distribution is selected using a NACA aerofoil having a specified the thickness to length ratio.

Finally, at step 62 an edge treatment is applied to each of the leading edge and trailing edge. These edge treatments are circular in cross-section, i.e. ellipses having a ratio between the minor and major lengths of 1.0.

It will be appreciated that these steps 50-62 are interrelated and may be carried out in parallel rather than sequentially. Alternatively, these steps 50-62 may be carried out in a different order. Together steps 50-62 define the constraints that are applied to the design of known vanes.

Figure 3:
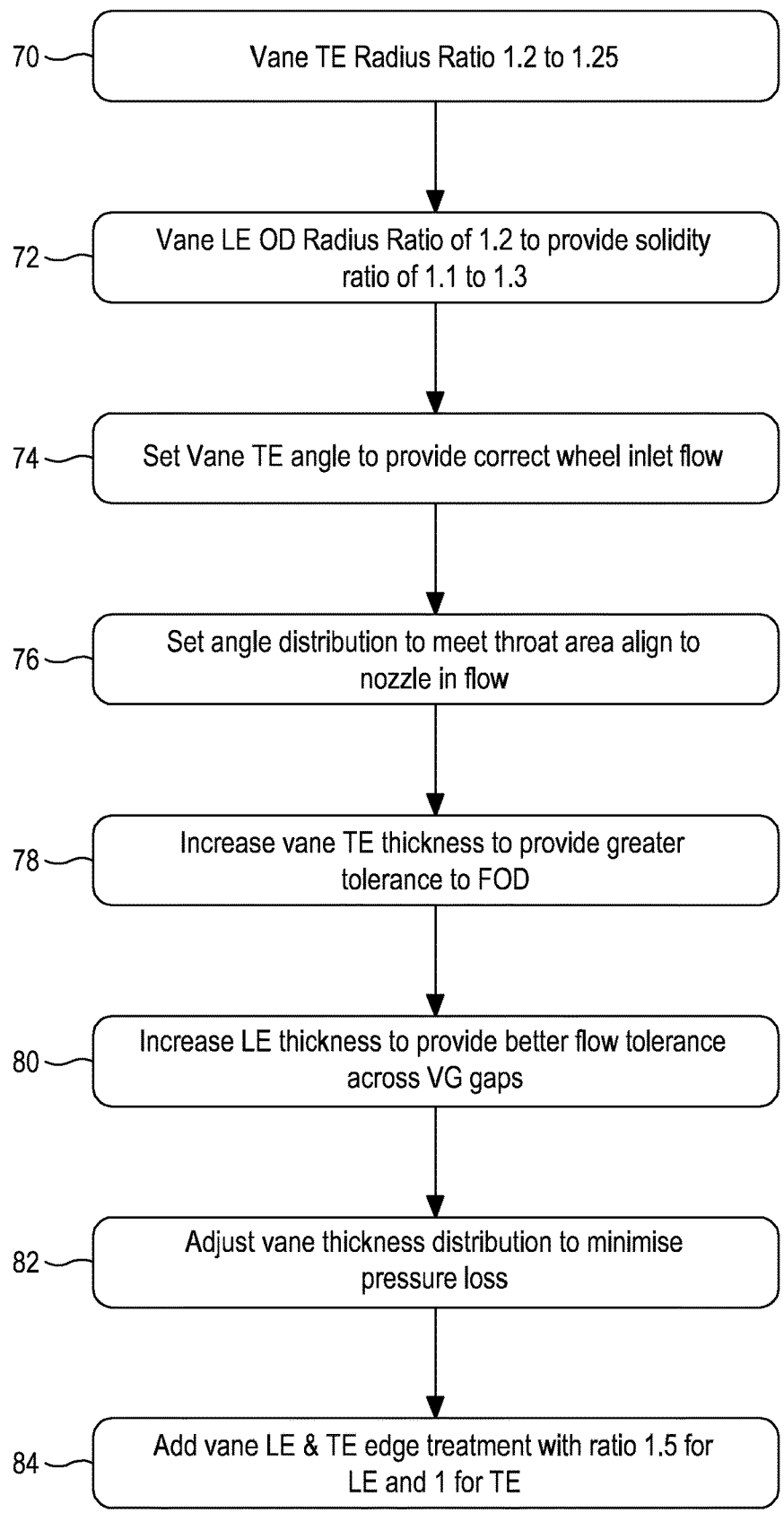
FIG. 3 illustrates the steps of a first new method or process according to an embodiment of the disclosure for designing the vanes for a variable geometry turbine of the type of turbine shown in FIG. 1.

FIG. 3 illustrates the steps of a first new method or process according to an embodiment of the disclosure for designing the vanes 15 for a variable geometry turbine of the type of turbine shown in FIG. 1.

At step 70, the radius of the trailing edge of the vanes 15 is selected such that the ratio of the radius of the trailing edge of the vanes 15 to the radius of the tip (or leading edge) of the turbine wheel 6 is within the range 1.2 to 1.25. This is a significant departure from existing methods (see step 50 in FIG. 2). This change, which would be contrary to the prejudice of the skilled person, has a number of advantages.

First, by moving the vanes 15 further away from the turbine wheel 6, the wake formed downstream of each vane will dissipate more before it reaches the turbine wheel 6, decreasing the forcing function. Furthermore, this may allow for a larger than standard dimension of the trailing edge of the vanes 15 (see step 78) and still allow sufficient distance for the wake to dissipate sufficiently to provide a forcing function having a reasonable amplitude.

At step 72, the outer diameter of the vane leading edge is selected such that the ratio of the radius of the leading edge of the vanes 15 to the radius of the trailing edge of the vanes 15 is 1.2 so as to provide a solidity ratio of 1.1 to 1.3. The vane solidity ratio is the ratio of the vane length to the width of the passage defined between each pair of adjacent vanes. A higher ratio will result in a longer vane to passage width which will result in a vane overlap. Increasing the vane overlap provides better control of the flow between the vanes.

At step 74, an angle of the trailing edge of the vane is selected so as to provide the correct wheel inlet flow for the turbine wheel 6.

At step 76, an angle distribution of the vane 15 is selected so as to align with the expected angle of flow into the nozzle ring 12 and to provide a target throat area. The target throat area is selected in order to achieve a target mass flow range. In turn, this target mass flow is selected to maximise the efficiency of the turbine.

At step 78, the thickness of the vane 15 at the trailing edge is increased (relative to known vane shapes) to provide increased tolerance to foreign object damage (FOD).

At step 80 the thickness of the vane 15 at the leading edge is increased (relative to known vane shapes). As discussed above, this is a significant departure from existing methods and would be contrary to the prejudice of the skilled person. By increasing the thickness of the vanes at the leading edge the variable geometry turbine will operate with a relatively high efficiency over a larger range of angles of attack (and therefore, equivalently, over a larger range of positions of the movable wall member 12 or VG gaps). In addition, the variable geometry turbine will maintain the amplitude of the forcing function relatively low over a significantly larger range of positions of the movable wall member 12.

At step 82 the thickness distribution of the vane 15 is selected to minimise pressure loss.

Finally, at step 84 an edge treatment is applied to each of the leading edge and trailing edge. The edge treatment for the leading edge is elliptical in cross-section, having a ratio between the minor and major lengths of 1.5. The edge treatment for the trailing edge is circular in cross-section, i.e. an ellipse having a ratio between the minor and major lengths of 1.0.

It will be appreciated that vanes 15 designed using the method illustrated in FIG. 3 have at least the following distinguishing features over existing arrangements: the vanes 15 are radially further out from the turbine wheel 6, the vanes have an increases trailing edge, the vanes have an increased leading edge and the edge treatment for the leading edge of the vanes is elliptical in cross-section.

Figure 4:
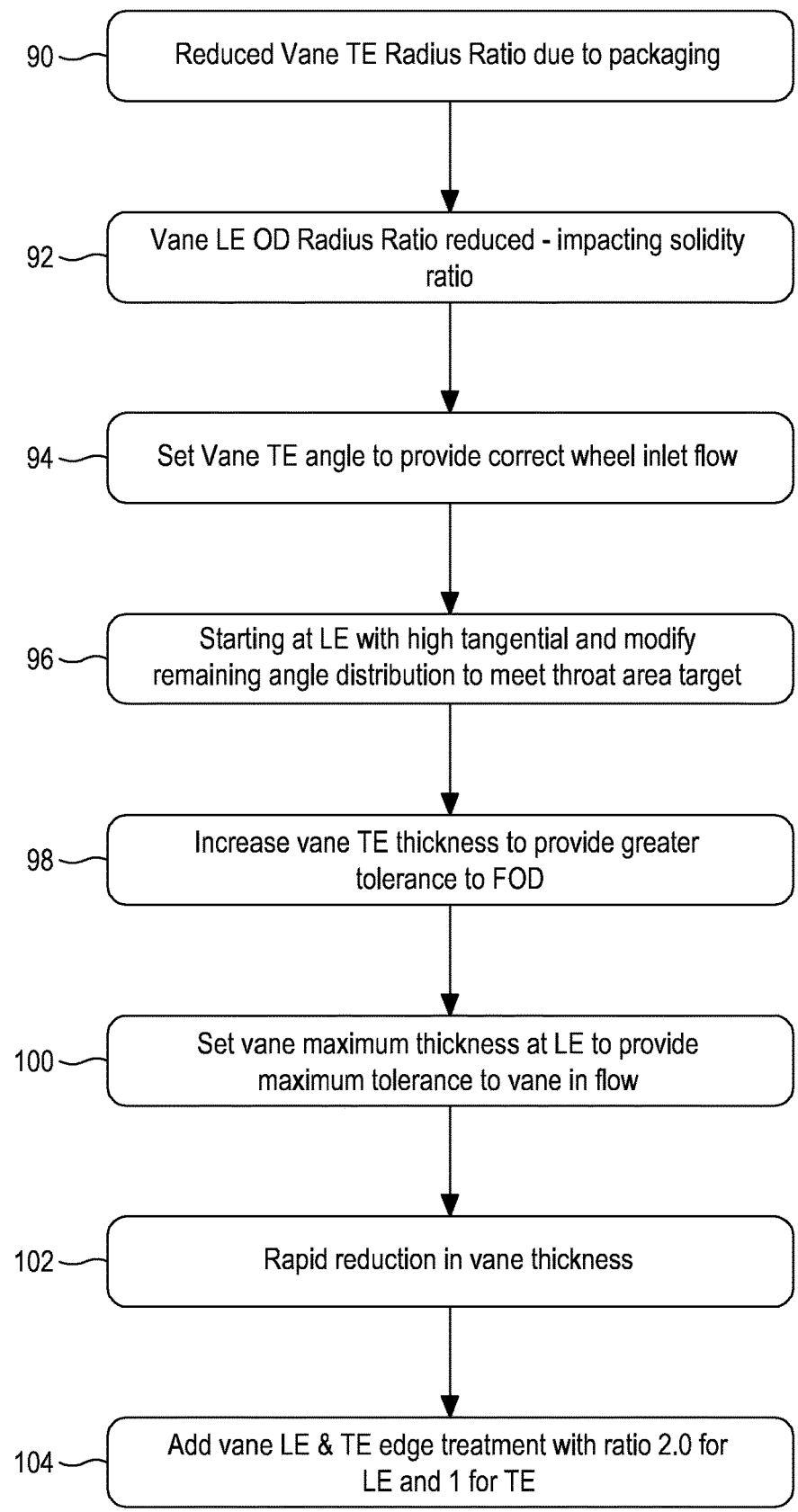
FIG. 4 illustrates the steps of a second new method or process according to an embodiment of the disclosure for designing the vanes for a variable geometry turbine of the type of turbine shown in FIG. 1.

FIG. 4 illustrates the steps of a second new method or process according to an embodiment of the disclosure for designing the vanes 15 for a variable geometry turbine of the type of turbine shown in FIG. 1. In particular, the method illustrated in FIG. 4 is particularly suitable for a turbine wherein there is reduced freedom to move the vanes 15 radially outwards sufficiently far so as to use the method illustrated in FIG. 3.

At step 90, the radius of the trailing edge of the vanes 15 is selected. In particular, the radius of the trailing edge of the vanes 15 is selected so as to be increased relative to the arrangement resulting from the known method of FIG. 2 but which is reduced relative to the new method of FIG. 3, for example, due to packing requirements. That is, it may be that due to packing or space requirements it is not possible to achieve a ratio of the radius of the trailing edge of the vanes 15 to the radius of the tip (or leading edge) of the turbine wheel 6 is within the range 1.2 to 1.25. With this arrangement a smaller ratio of the radius of the trailing edge of the vanes 15 to the radius of the tip of the turbine wheel 6, for example around 1.1 may be selected at step 90.

At step 92, the outer diameter of the vane leading edge is selected. Again, the outer diameter of the vane leading edge is reduced relative to the new method of FIG. 3, for example, due to packing requirements. In turn, this may result in a reduced solidity ratio.

At step 94, an angle of the trailing edge of the vane is selected so as to provide the correct wheel inlet flow for the turbine wheel 6.

At step 96, in contrast to existing methods, the angle distribution of the vane 15 is selected so as to be more tangential than existing methods. The angle distribution of the vane 15 is selected to match the expected angle of flow into the nozzle ring 12 and to provide a target throat area. The target throat area is selected in order to achieve a target mass flow range. In turn, this target mass flow is selected to maximise the efficiency of the turbine.

At step 98, the thickness of the vane 15 at the trailing edge is increased (relative to known vane shapes) to provide increased tolerance to foreign object damage (FOD).

At step 100 the thickness of the vane 15 at the leading edge is increased (relative to known vane shapes). As discussed above, this is a significant departure from existing methods and would be contrary to the prejudice of the skilled person. By increasing the thickness of the vanes at the leading edge the variable geometry turbine will operate with a relatively high efficiency over a larger range of angles of attack (and therefore, equivalently, over a larger range of positions of the movable wall member 12 or VG gaps). In addition, the variable geometry turbine will maintain the amplitude of the forcing function relatively low over a significantly larger range of positions of the movable wall member 12.

At step 102 the thickness distribution of the vane 15 is selected to provide a rapid (for example exponential) reduction in vane thickness between the leading and trailing edges. Again, this is a significant departure from existing arrangements which would typically increase from the leading edge up to a thicker central portion of the vane before decreasing towards the trailing edge.

Finally, at step 104 an edge treatment is applied to each of the leading edge and trailing edge. The edge treatment for the leading edge is elliptical in cross-section, having a ratio between the minor and major lengths of 2.0. The edge treatment for the trailing edge is circular in cross-section, i.e. an ellipse having a ratio between the minor and major lengths of 1.0.

Some new inlet vanes 15 which extend across the inlet passageway 11 of a variable geometry turbine of the type of turbine shown in FIG. 1 are now discussed with reference to FIGS. 5A to 7C.

In general, the shape of a vane is defined by two opposed surfaces (which may be referred to as the pressure and suction surfaces of the vane) extending between the leading edge and the trailing edge. As previously states, the leading edge of a vane shall be understood to be a radially outer end of the vane and the trailing edge of a vane shall be understood to be a radially inner end of the vane.

In the following, a straight line connecting the leading edge to the trailing edge is referred to as a chord. Similarly, a line connecting the leading edge to the trailing edge which bisects the vane (i.e. is halfway between the two opposed surfaces of the vane) is referred to as a camber or camber line. It will be appreciated that, in general, the camber of a vane is curved.

As used herein, an angular distribution of a vane is intended to mean the angle between a tangent to the camber line and a radial direction (relative to the turbocharger axis 8) as a function of position along the vane. The angular distribution defines the camber of the vane.

As used herein, a thickness distribution of a vane is intended to mean the thickness of the aerofoil perpendicular to a camber line of the vane as a function of position along the vane.

Together, the angular distribution and the thickness distribution define an envelope which defines the general shape of the vane. This envelope (which has blunt, flat edges at the leading edge and trailing edge) is then modified by the edge treatments described above (see steps 62, 84, 104 in FIGS. 2, 3, 4), which smooths or removes these sharp edges at the leading and trailing edge.

FIG. 5A shows an arrangement 110 of vanes 112 designed according to the known method shown in FIG. 2 in a plane perpendicular to the turbocharger axis 8. The arrangement 110 comprises 14 vanes 112 arranged evenly around the turbocharger axis 8.

FIG. 5B shows the thickness distribution 114 of the vanes 112 shown in FIG. 5A as a percentage along the length of the vanes 112 (from the leading edge 112a to the trailing edge 112b).

FIG. 5C shows the angular distribution 116 of the vanes 112 shown in FIG. 5A as a percentage along the length of the vanes 112 (from the leading edge 112a to the trailing edge 112b).

In the arrangement 110 of vanes 112, the ratio of the radius of the trailing edge 112b of the vanes 112 to the radius of the tip (or leading edge) of the turbine wheel 6 is 1.09. The vanes have a thickness distribution defined by a thin NACA aerofoil. As can be seen from the angular distribution 116, these vanes have a fairly radial leading edge angle of around 0.5 radians. The angular distribution 116 performs most of the turning of the fluid flow in the first 35% of the length of the vanes 112, with little change thereafter.

Figure 6B:
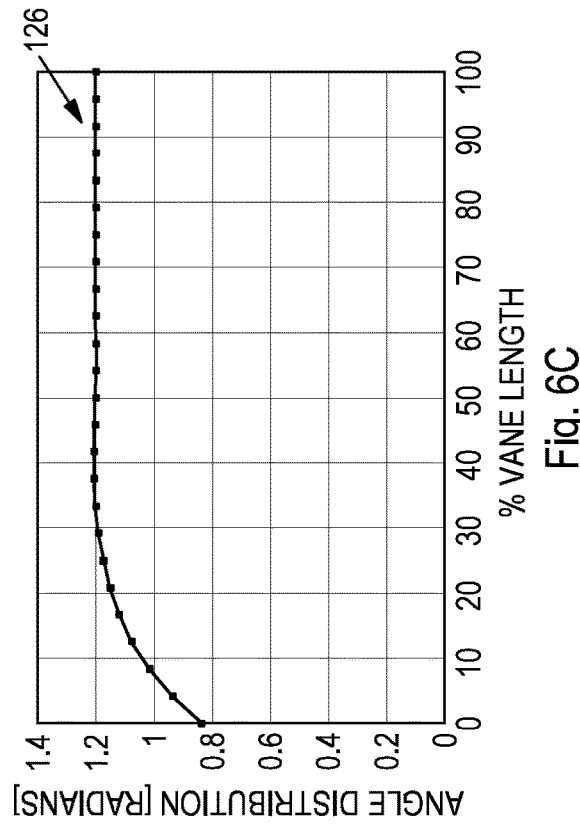
FIG. 6B shows the thickness distribution of the vanes shown in FIG. 6A as a percentage along the length of the vanes.
Figure 6C:
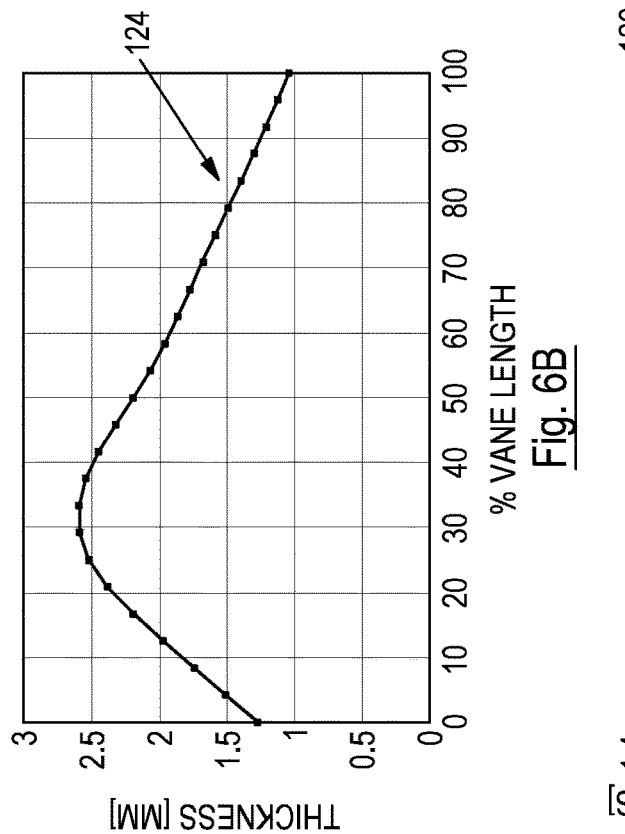
FIG. 6C shows the angular distribution of the vanes shown in FIG. 6A as a percentage along the length of the vanes.
Figure 6A:
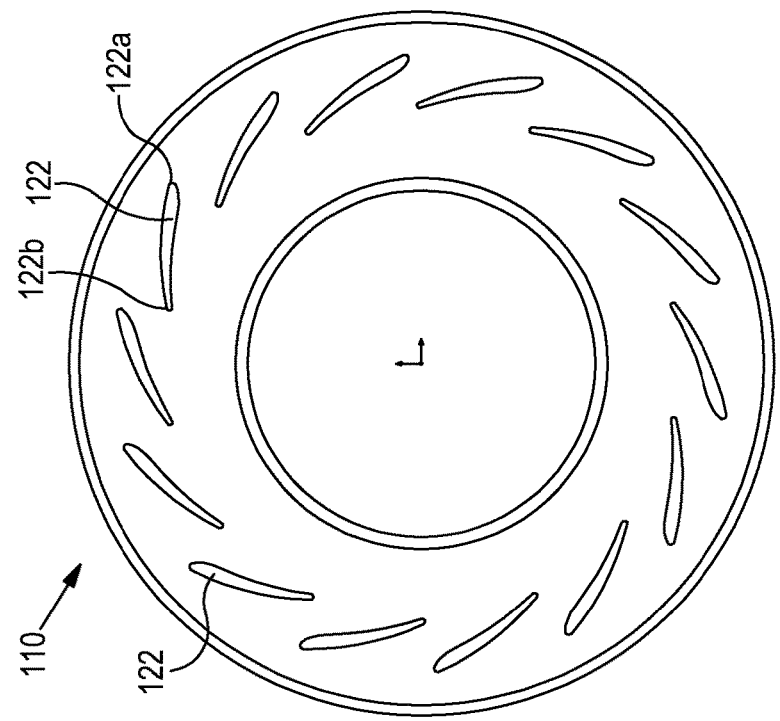
FIG. 6A shows an arrangement of vanes designed according to the new method shown in FIG. 3 in a plane perpendicular to the turbocharger axis.

FIG. 6A shows an arrangement 120 of vanes 122 designed according to the new method shown in FIG. 3 in a plane perpendicular to the turbocharger axis 8. The arrangement 120 comprises 14 vanes 122 arranged evenly around the turbocharger axis 8.

FIG. 6B shows the thickness distribution 124 of the vanes 122 shown in FIG. 6A as a percentage along the length of the vanes 122 (from the leading edge 122a to the trailing edge 122b).

FIG. 6C shows the angular distribution 126 of the vanes 122 shown in FIG. 6A as a percentage along the length of the vanes 122 (from the leading edge 122a to the trailing edge 122b).

In the arrangement 120 of vanes 122, the ratio of the radius of the trailing edge 122b of the vanes 122 to the radius of the tip (or leading edge) of the turbine wheel 6 is 1.2. The vanes have a thickness distribution defined by an adjusted NACA aerofoil having increased thickness at the leading edge 122a and the trailing edge 122b (relative to a standard NACA aerofoil).

The increased trailing edge 122b thickness of the vanes 122 for FOD results in a larger wake than is caused by the vanes 112 shown in FIG. 5A. However, since the ratio of the radius of the trailing edge 122b of the vanes 122 to the radius of the tip (or leading edge) of the turbine wheel 6 is increased to 1.2, this vane wake dissipates further from the turbine wheel 6 leading edge than does the wake caused by the vanes 112 shown in FIG. 5A. Furthermore, the arrangement 120 shown in FIG. 6A results in a lower static pressure fluctuation at the leading edge of the turbine wheel 6 compared to the arrangement 110 shown in FIG. 5A. Furthermore, as will be discussed further below, the increases leading edge 122a thickness increases the tolerance of the arrangement to a range of angles of attack.

The thickness distribution 124 of the vanes 122 shown in FIG. 6A as a percentage along the length of the vanes 122 (from the leading edge 122a to the trailing edge 122b) is also given in Table 1.

The angular distribution 126 of the vanes 122 shown in FIG. 6A as a percentage along the length of the vanes 122 (from the leading edge 122a to the trailing edge 122b) is also given in Table 2.

The x-y co-ordinates of four curves which define the shape and position of one of the vanes 122 shown in FIG. 6A are given in Tables 3 to 6. The four curves are: a leading edge treatment curve (Table 3); a first side of the vane 122 (Table 4); a trailing edge treatment curve (Table 5); and a second side of the vane 122 (Table 6). The four curves given in Tables 3 to 6 define the shape and position of one of the vanes 122 shown in FIG. 6A in a plane perpendicular to the turbocharger axis 8, with the co-ordinates such that the origin coincides with the position of the turbocharger axis 8 (i.e. the turbocharger axis 8 is at x=y=0). It will be appreciated that the other (13) vanes have the same size and shape as that defined by the four curves given in Tables 3 to 6 but are disposed at different positions with respect to the axis. In particular, as stated above, the (14) vanes 122 are arranged evenly around the turbocharger axis 8. Therefore, the positions of the other (13) vanes can be obtained by rotating the x-y co-ordinates of the four curves given in Tables 3 to 6 about the origin by n·360/14 degrees, where n is an integer between 1 and 13 inclusive.

Figure 7B:
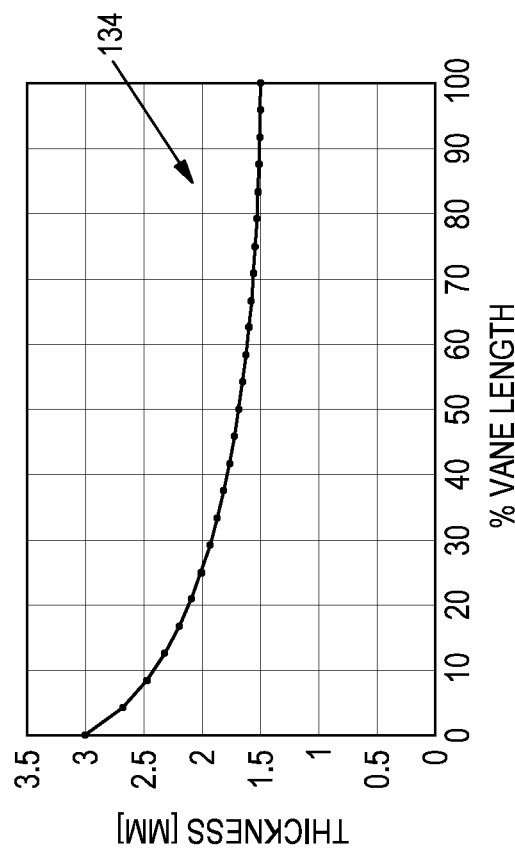
FIG. 7B shows the thickness distribution of the vanes shown in FIG. 7A as a percentage along the length of the vanes.
Figure 7C:
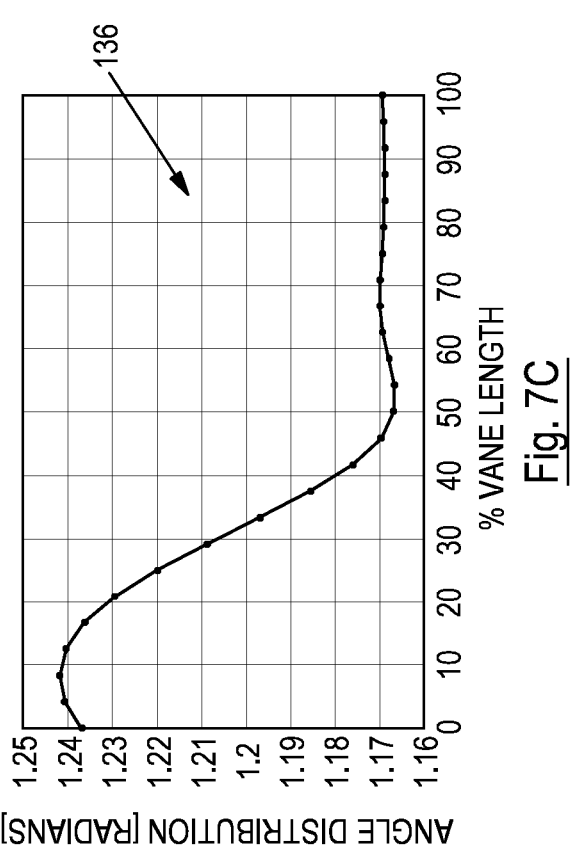
FIG. 7C shows the angular distribution of the vanes shown in FIG. 7A as a percentage along the length of the vanes.
Figure 7A:
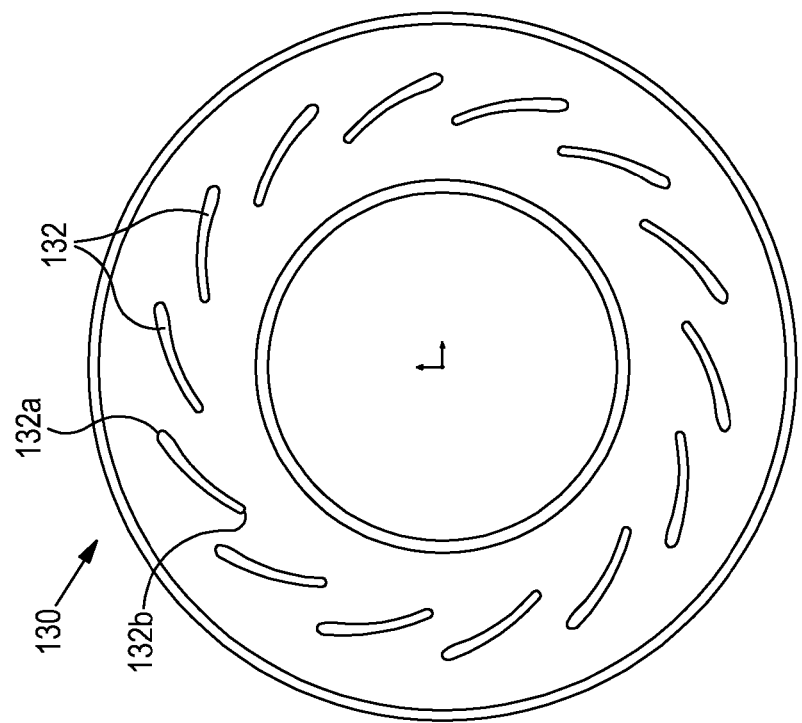
FIG. 7A shows an arrangement of vanes designed according to the new method shown in FIG. 4 in a plane perpendicular to the turbocharger axis.

FIG. 7A shows an arrangement 130 of vanes 132 designed according to the new method shown in FIG. 4 in a plane perpendicular to the turbocharger axis 8. The arrangement 130 comprises 14 vanes 132 arranged evenly around the turbocharger axis 8.

FIG. 7B shows the thickness distribution 134 of the vanes 132 shown in FIG. 7A as a percentage along the length of the vanes 132 (from the leading edge 132a to the trailing edge 132b).

FIG. 7C shows the angular distribution 136 of the vanes 132 shown in FIG. 7A as a percentage along the length of the vanes 132 (from the leading edge 132a to the trailing edge 132b).

In the arrangement 130 of vanes 132 shown in FIG. 7A, the ratio of the radius of the trailing edge 132b of the vanes 132 to the radius of the tip (or leading edge) of the turbine wheel 6 is 1.14. The vanes 132 have an exponentially decreasing thickness distribution 134. The vanes 132 have a significantly increased thickness at the leading edge 132a (relative to a standard NACA aerofoil). In addition, as can be seen from the angular distribution 136, the vanes 132 have an angular distribution which is tangential at the leading edge 132a.

The vanes 132 also have a significantly increased thickness at the trailing edge 132b (relative to a standard NACA aerofoil). As with the vanes 122 shown in FIG. 6A, the increased trailing edge 132b thickness of the vanes 132 in FIG. 7A results in a larger wake than is caused by the vanes 112 shown in FIG. 5A. However, since the ratio of the radius of the trailing edge 132b of the vanes 132 in FIG. 7A to the radius of the tip (or leading edge) of the turbine wheel 6 is reduced relative to vanes 122 shown in FIG. 6A, this vane wake does not dissipate before the flow impinges on the turbine wheel 6 leading edge.

As will be described further below, the shape of the vanes 132 shown in FIG. 7A is such that there is a significant contribution to the variation in static pressure around the leading edge of the turbine wheel 6 having a pitch smaller than the pitch of the vanes 132. In particular the turbine wheel 6 leading edge static pressure variation has an additional region of low pressure close to the trailing edge 132b of the vanes 132 which results in a non-vane order pressure fluctuation on the leading edge of the turbine wheel 6. As a result, the arrangement 130 shown in FIG. 7A results in a lower static pressure fluctuation at the leading edge of the turbine wheel 6 compared to the arrangement 110 shown in FIG. 5A. Furthermore, as will be discussed further below, the increases leading edge 132a thickness increases the tolerance of the arrangement to a range of angles of attack.

The thickness distribution 134 of the vanes 132 shown in FIG. 7A as a percentage along the length of the vanes 132 (from the leading edge 132a to the trailing edge 132b) is also given in Table 7.

The angular distribution 136 of the vanes 132 shown in FIG. 7A as a percentage along the length of the vanes 132 (from the leading edge 132a to the trailing edge 132b) is also given in Table 8.

The x-y co-ordinates of four curves which define the shape and position of one of the vanes 132 shown in FIG. 7A are given in Tables 9 to 12. The four curves are: a leading edge treatment curve (Table 9); a first side of the vane 132 (Table 10); a trailing edge treatment curve (Table 11); and a second side of the vane 132 (Table 12). The four curves given in Tables 9 to 12 define the shape and position of one of the vanes 132 shown in FIG. 7A in a plane perpendicular to the turbocharger axis 8, with the co-ordinates such that the origin coincides with the position of the turbocharger axis 8 (i.e. the turbocharger axis 8 is at x=y=0). It will be appreciated that the other (13) vanes have the same size and shape as that defined by the four curves given in Tables 9 to 12 but are disposed at different positions with respect to the axis 8. In particular, as stated above, the (14) vanes 132 are arranged evenly around the turbocharger axis 8. Therefore, the positions of the other (13) vanes can be obtained by rotating the x-y co-ordinates of the four curves given in Tables 9 to 12 about the origin by n·360/14 degrees, where n is an integer between 1 and 13 inclusive.

The relative performances of the new inlet vanes described above are now discussed with reference to FIGS. 8A to 13C.

Figure 8A:
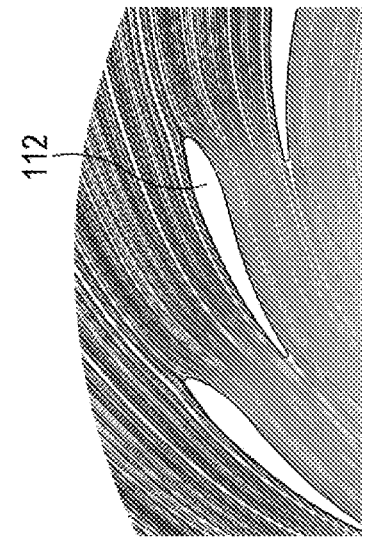
FIGS. 8A to 8C illustrate the performance of the arrangement of vanes shown in FIG. 5A for an exhaust flow for which the arrangement has been designed.
Figure 8B:
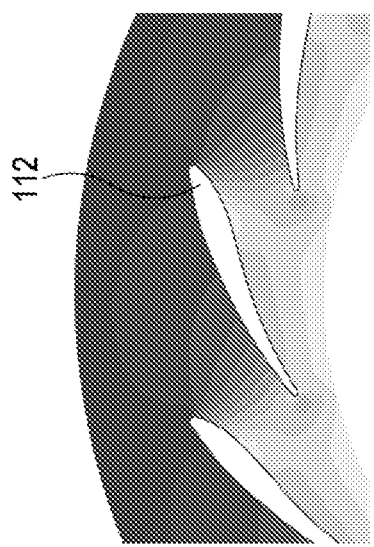
Figure 8C:
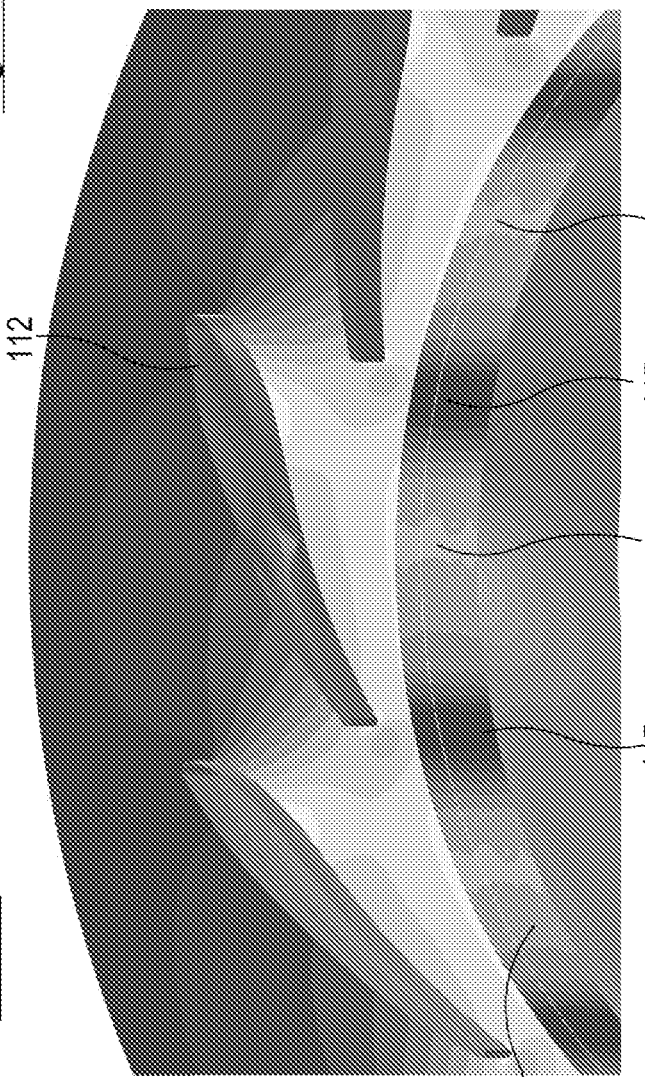
Figure 9B:
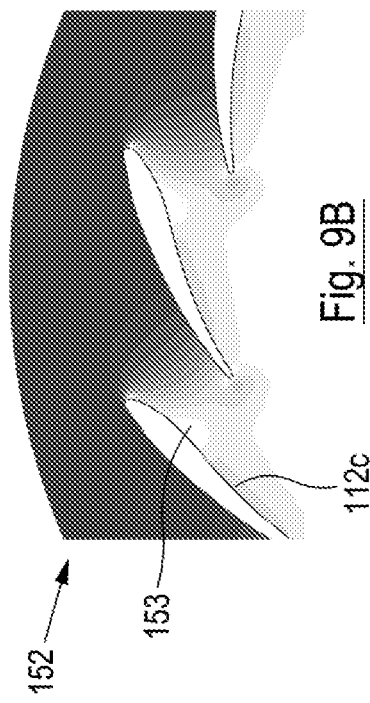
FIGS. 9A to 9C illustrate the performance of the arrangement of vanes shown in FIG. 5A for an exhaust flow for which the arrangement has not been designed.
Figure 9A:
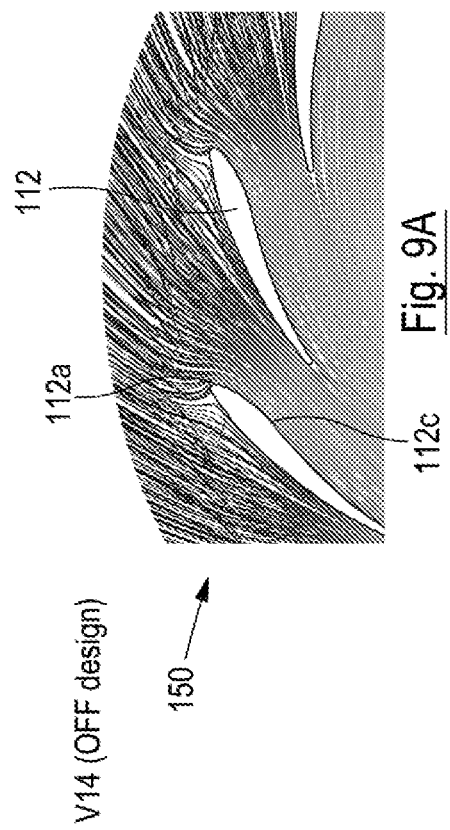
Figure 9C:
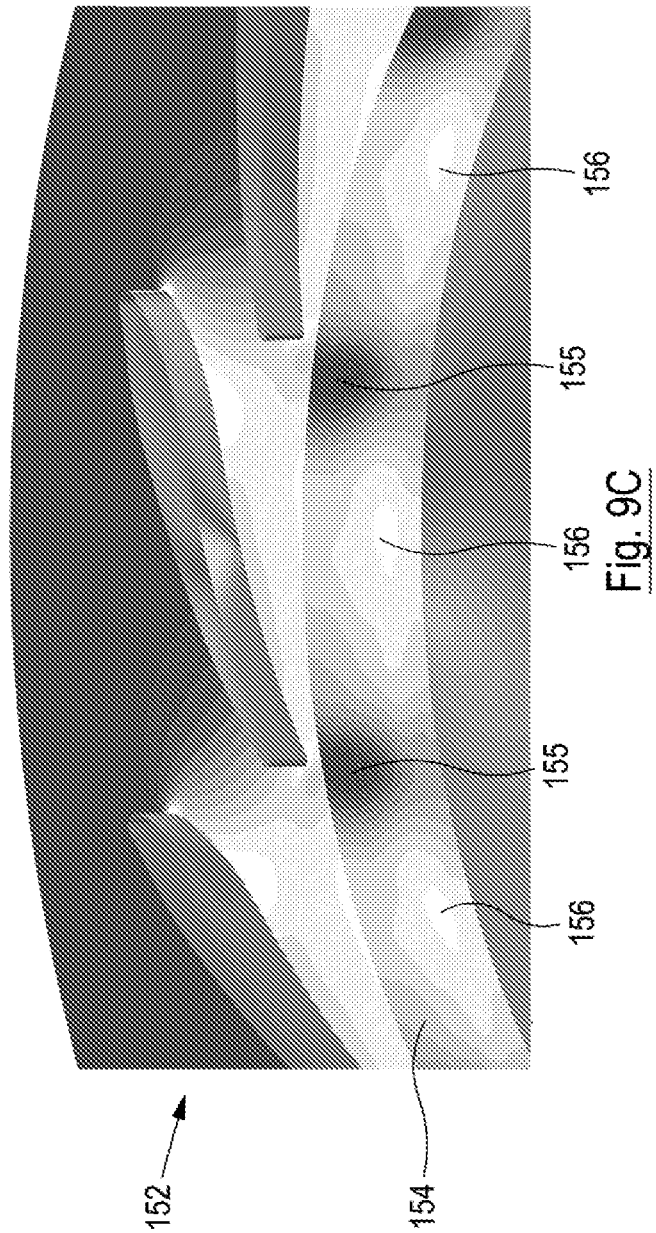

FIGS. 8A to 9C illustrate the performance of the arrangement 110 of vanes 112 shown in FIG. 5A. In particular, FIGS. 8A to 8C illustrate the performance of the arrangement 110 of vanes 112 shown in FIG. 5A for an exhaust flow for which the arrangement 110 has been designed and FIGS. 9A to 9C illustrate the performance of the arrangement 110 for an exhaust flow for which the arrangement 110 has not been designed. FIGS. 8A and 9A show plots 140, 150 of flow lines through the arrangement 110; FIGS. 8B and 9B show pressure distributions 142, 152 through the arrangement 110; and FIGS. 8C and 9C show the same pressure distributions 142, 152 through the arrangement 110 and, in addition, static pressure distributions 144, 154 at the leading edge of the turbine wheel 6.

Figure 10A:
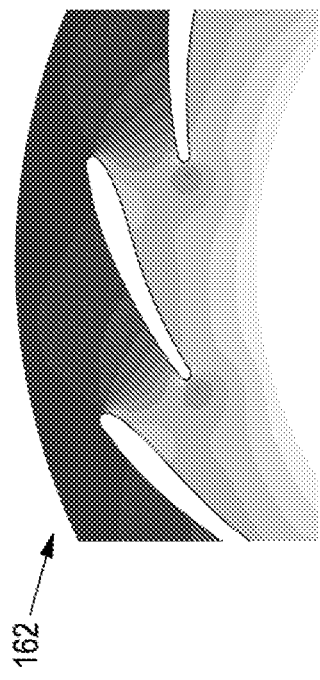
FIGS. 10A to 10C illustrate the performance of the arrangement of vanes shown in FIG. 6A for an exhaust flow for which the arrangement has been designed.

FIGS. 10A to 11C illustrate the performance of the arrangement 120 of vanes 122 shown in FIG. 6A. In particular, FIGS. 10A to 10C illustrate the performance of the arrangement 120 of vanes 122 shown in FIG. 6A for an exhaust flow for which the arrangement 120 has been designed and FIGS. 11A to 11C illustrate the performance of the arrangement 120 for an exhaust flow for which the arrangement 120 has not been designed. FIGS. 10A and 11A show plots 160, 170 of flow lines through the arrangement 120; FIGS. 10B and 11B show pressure distributions 162, 172 through the arrangement 120; and FIGS. 10C and 11C show the same pressure distributions 162, 172 through the arrangement 120 and, in addition, static pressure distributions 164, 174 at the leading edge of the turbine wheel 6.

Figure 13B:
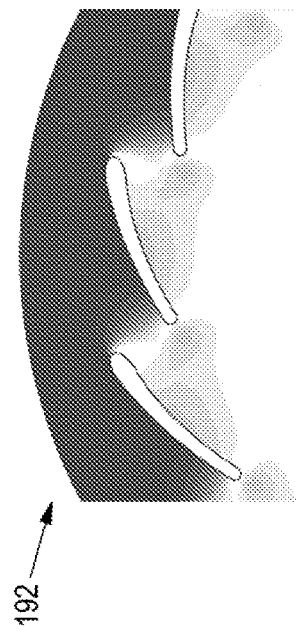
FIGS. 13A to 13C illustrate the performance of the arrangement of vanes shown in FIG. 7A for an exhaust flow for which the arrangement has not been designed.
Figure 13A:
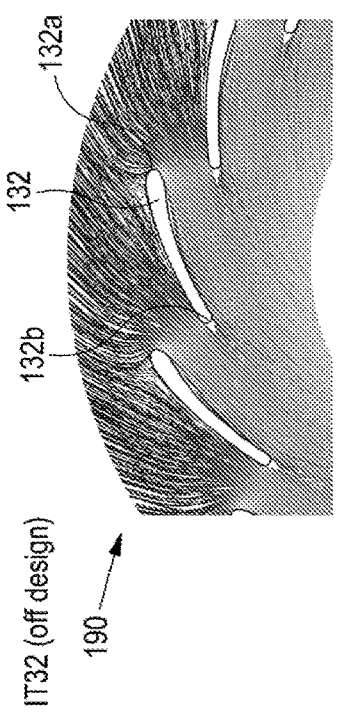
Figure 13C:
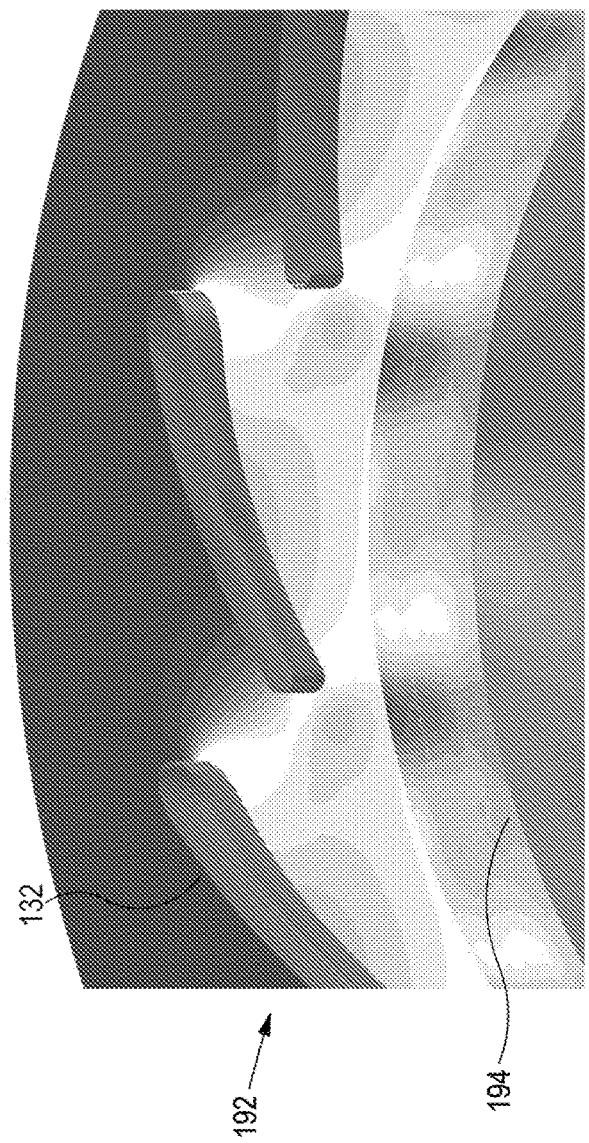

FIGS. 12A to 13C illustrate the performance of the arrangement 130 of vanes 132 shown in FIG. 7A. In particular, FIGS. 12A to 12C illustrate the performance of the arrangement 130 of vanes 132 shown in FIG. 7A for an exhaust flow for which the arrangement 130 has been designed and FIGS. 13A to 13C illustrate the performance of the arrangement 130 for an exhaust flow for which the arrangement 130 has not been designed. FIGS. 12A and 13A show plots 180, 190 of flow lines through the arrangement 130; FIGS. 12B and 13B show pressure distributions 182, 192 through the arrangement 130; and FIGS. 12C and 13C show the same pressure distributions 182, 192 through the arrangement 130 and, in addition, static pressure distributions 184, 194 at the leading edge of the turbine wheel 6.

First, consider the performance of the arrangement 110 of vanes 112 shown in FIG. 5A.

It should be understood that an exhaust flow for which the arrangement 110 has been designed is intended to mean a design point (for example a VG gap as defined by the movable wall member 12) which corresponds to a particular mass flow. Furthermore, as described above with reference to FIGS. 2 to 4, any reference (see steps 54, 76 and 96) to aligning an angle of the leading edge of the vane with the expected angle of flow into the nozzle ring 12 is intended to mean aligning the leading edge of the vane such that the throat (the region of minimum area in between the vanes) is aligned to the expected angle of flow into the nozzle ring 12 for this design point.

In the examples described herein, the design point (or, equivalently, an exhaust flow for which the arrangements have been designed) is for a flush gap arrangement wherein the VG gap substantially matches a width of a leading edge (or tip) of the turbine wheel 6. The angle of the exhaust gas as it impinges on the leading edge of the vanes at such a design point is dependent in the geometry of the inlet volute 9 (for example the area and radius of the critical area and the area and radius of the volute exit area, which forms an inlet for the nozzle ring). In the examples described herein, at the (flush gap) design point, at the leading edge of the vanes the gas flow is at approximately 60° to the radial direction.

In the examples described herein, the off-design point corresponds to a smaller VG gap at which the gas flow has overturned and impinges on the leading edge of the vanes at a more radial direction.

As can be seen from FIGS. 8A and 8B, at this design point, (where the throat of the nozzle ring is aligned to the gas flow) there is smooth flow between the vanes 112, with most of the work being done on the fluid in the first 25% of the vanes 112. Thereafter, the vanes 112 generally just act to guide the flow onto the turbine wheel 6. As shown in FIG. 8C, at this design point the static pressure distribution 144 (or forcing function) at the leading edge of the turbine wheel 6 has alternating regions of high pressure 145 (from the flow through the center of the passages between the vanes 112) and regions of low pressure 146 (from the wake of each vane 112 as the flow on either side of the vanes comes together).

As can be seen from FIG. 9A away from the design point, where the throat of the nozzle ring is not well aligned to the gas flow, the flow accelerates around the leading edge 112a of the vanes 112 onto the suction side 112c of the vanes. As can be seen from FIG. 9B, this causes an increased depression region 153 to develop on the suction side 112c of the vanes 112. In turn, this results in a significant increase in the static pressure distribution 154 (or forcing function) at the leading edge of the turbine wheel 6. The static pressure distribution 154 has alternating regions of high pressure 155 (from the flow through the center of the passages between the vanes 112) and increased regions of low pressure 156 (from the wake of each vane 112 as the flow on either side of the vanes comes together).

Next, consider the performance of the arrangement 120 of vanes 122 shown in FIG. 6A.

Figure 10B:
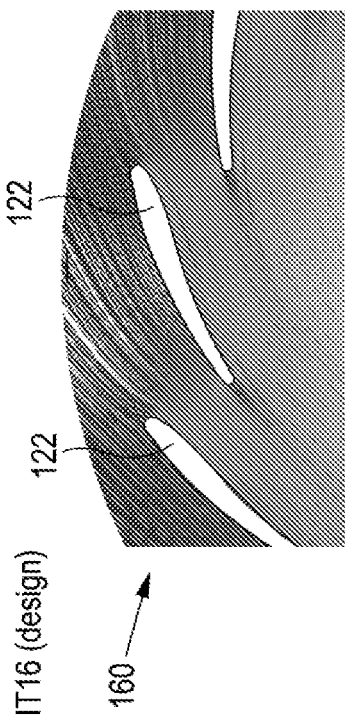
Figure 10C:
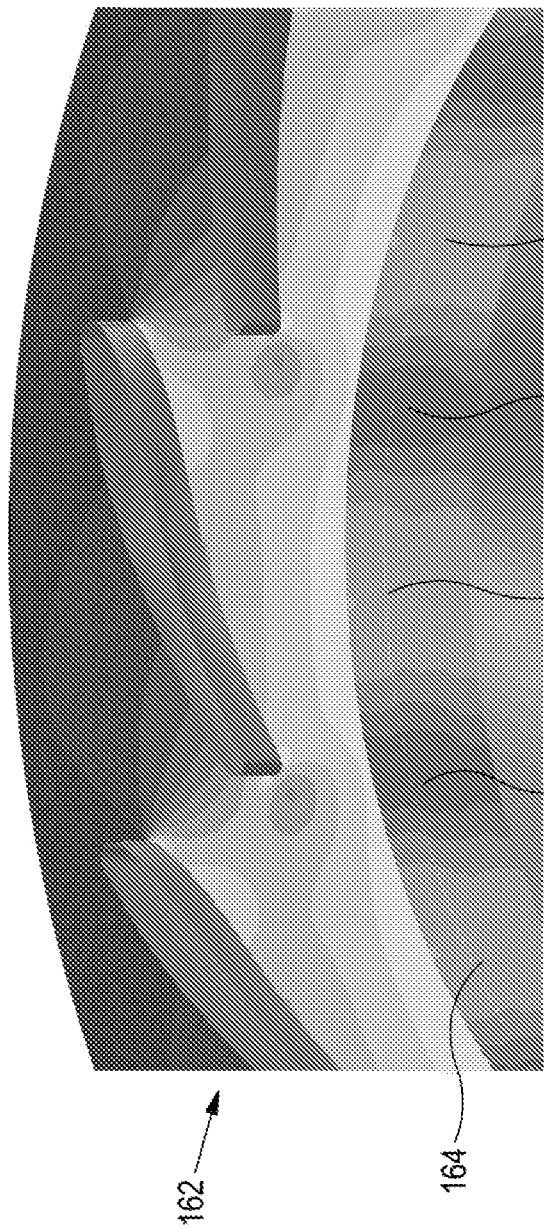

As can be seen from FIGS. 10A and 10B, at the design point, (where the throat of the nozzle ring is aligned to the gas flow) the increased leading edge 122a and trailing edge 122b thicknesses of the vanes 122 has little effect on the smooth flow between the vanes 122 (as compared to the flow between the vanes 112 shown in FIGS. 8A and 8B). As shown in FIG. 10C, at this design point the static pressure distribution 164 (or forcing function) at the leading edge of the turbine wheel 6 also has alternating regions of high pressure 165 (from the flow through the center of the passages between the vanes 122) and regions of low pressure 166 (from the wake of each vane 122 as the flow on either side of the vanes comes together). However, since the ratio of the radius of the trailing edge 122b of the vanes 122 to the radius of the tip (or leading edge) of the turbine wheel 6 is increased (relative to the arrangement 110 shown in FIGS. 8) to 1.2, the vane wake dissipates further from the turbine wheel 6 leading edge. As a result, there is smaller amplitude difference between the regions of high pressure 165 and regions of low pressure 166, which results in a lower amplitude of static pressure 164 fluctuation at the leading edge of the turbine wheel 6 compared to the arrangement 110 shown in FIG. 5A.

As can be seen from FIG. 11A away from the design point, where the throat of the nozzle ring is not well aligned to the gas flow, again the flow accelerates around the leading edge 122a of the vanes 122 onto the suction side 122c of the vanes 122. However, as can be seen from FIG. 11B, although this causes an increased depression region 173 to develop on the suction side 112c of the vanes 112, this increased depression region 173 off design point is significantly reduced relative to the corresponding increased pressure region 153 which develops off design point for the arrangement 110 of FIG. 5A (see FIG. 9B). It is thought that this is due to the increased, more bulbous leading edge 122a of these vanes 122, which allow the flow 170 (see FIG. 11A) to better follow the suction side 122c of the vanes 122 after accelerating around the leading edge 122a.

In turn, although there will be an increase in the static pressure distribution 174 (or forcing function) at the leading edge of the turbine wheel 6 (relative to the design point, see FIG. 10C), this increase is significantly reduced relative to the corresponding increase experienced with the arrangement 110 of FIG. 5A (see FIGS. 8C and 9C). The static pressure distribution 174 has alternating regions of high pressure 175 (from the flow through the center of the passages between the vanes 122) and increased regions of low pressure 176 (from the wake of each vane 122 as the flow on either side of the vanes comes together). Furthermore, since the ratio of the radius of the trailing edge 122b of the vanes 122 to the radius of the tip (or leading edge) of the turbine wheel 6 is increased (relative to the arrangement 110 shown in FIGS. 9) to 1.2, the vane wake dissipates further from the turbine wheel 6 leading edge. As a result, there is smaller amplitude difference between the regions of high pressure 175 and regions of low pressure 176, which results in a lower amplitude of static pressure 174 fluctuation at the leading edge of the turbine wheel 6 compared to the arrangement 110 shown in FIG. 5A.

Next, consider the performance of the arrangement 130 of vanes 132 shown in FIG. 7A.

As can be seen from FIGS. 12A and 12B, at the design point, (where the throat of the nozzle ring is aligned to the gas flow) the increased leading edge 132a and trailing edge 132b thicknesses of the vanes 132 has little effect on the smooth flow between the vanes 122 (as compared to the flow between the vanes 112 shown in FIGS. 8A and 8B).

As shown in FIG. 12C, at this design point the static pressure distribution 184 (or forcing function) at the leading edge of the turbine wheel 6 also has alternating regions of high pressure (from the flow through the center of the passages between the vanes 132) and regions of low pressure (from the wake of each vane 132 as the flow on either side of the vanes comes together). However, due to the specific and rather unusual shape of these vanes 132, the two separate low pressure regions (which arise from the disturbance caused by the vanes 132) are formed in the pitch of the vanes 132. Therefore, rather than just a static pressure distribution 184 which varies with a smaller to that of the vanes 132 (for example around half the pitch). With 14 vanes 132, one may expect a dominant contribution to the static pressure distribution 184 around the circumference of the turbine wheel 6 to vary with 14 peaks and 14 troughs. This may be referred to a 14th order or vane order oscillation. However, due to the specific and rather unusual shape of these vanes, there is also a significant contribution to the static pressure distribution around the circumference of the turbine wheel 6 to vary with 28 peaks and 28 troughs. This may be referred to a 28th order or non-vane order oscillation.

Figure 14:
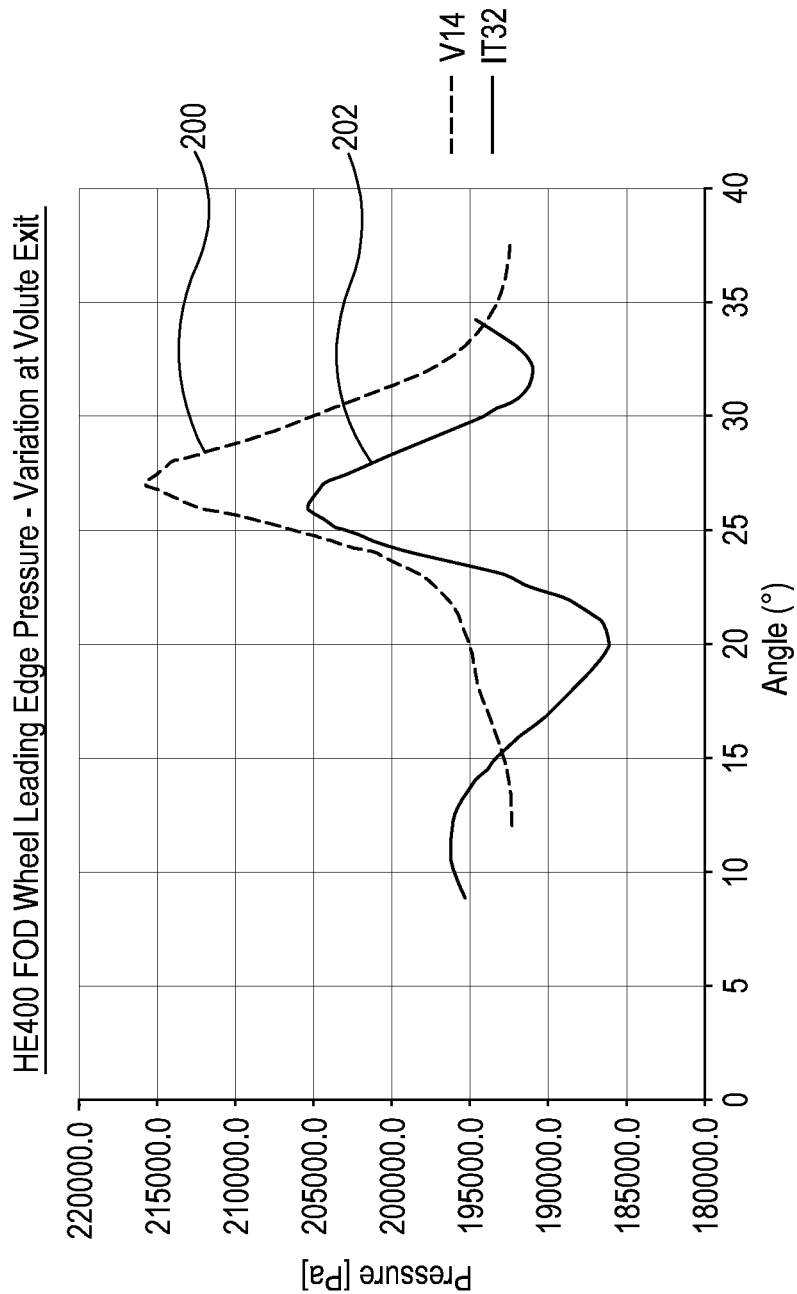
FIG. 14 shows the static pressure variation over an angular region of the turbine wheel corresponding to a single vane for the arrangements shown in FIGS. 5A and 7A.

This can be seen more clearly in FIG. 14, which shows the static pressure variation 200, 202 (averaged over the axial direction) over an angular region of the turbine wheel 6 corresponding to a single vane 112, 132 for the arrangements 110, 130 shown in FIGS. 5A and 7A respectively. These averaged static pressure variations 200, 202 are equivalent to the static pressure distributions 144, 184 shown in FIGS. 8C and 12C by averaging in the axial directions 148, 188 indicated in those Figures.

It is clear from the averaged static pressure variations 200, 202 that as a result of this excitation of the non-vane order oscillations, the overall amplitude of the static pressure variations has been reduced (the amplitude of variation 202 being less than that of the variation 200).

It is thought that this separation of the wake caused by the shape of the vanes 132 shown in FIG. 7A is due the flow experiencing different losses on the suction side 132c and pressure side 132d of the vanes 132. That is, rather than the pressure of the flow on the opposite sides of the vane being equal at the trailing edge 132b of the vanes 132 (as would be the case for a conventional aerofoil shape) there is a pressure differential across these flows.

It is thought that the separation of the wake is caused by a combination of: (a) an increased (more bulbous) thickness of the leading edge 132a of the vanes 132; (b) a rapid reduction in the thickness distribution, in combination with (c) the leading edge 132a of the vanes 132 being directed more tangentially. As the gas flows over the leading edge 132a onto the suction side 132c of the vane 132, in contrast to a traditional aerofoil shape which would then have a thicker portion to slowly guide the flow along the suction side, the suction side 132c of these vanes 132 suddenly falls away, making it difficult for the flow to follow it and causing separation of the flow from the suction side 132c. As can be seen from FIG. 12A, the bulk of this flow is still quite well guided onto the turbine wheel 6, at least partially by the higher pressure flow through a central portion of the passageways between the vanes 132. However, there is sufficient separation to cause a double wake that excites the non-vane order oscillations on the static pressure distribution 184 (also referred to herein as a forcing function).

This effect is thought to be enhanced by the fact that the leading edges 132a of the vanes 132 are turned more tangentially (which may, for example, be in order to close the throat of the nozzle despite the vanes being of reduced length due to packing constraints). However, it will be appreciated that this enhancement may not be necessary.

As can be seen from FIG. 13A away from the design point, where the throat of the nozzle ring is not well aligned to the gas flow, again the flow accelerates around the leading edge 132a of the vanes 132 onto the suction side 132c of the vanes 132. As can be seen from the flow lines through the arrangement 130 (see FIG. 13A), off design point the flow is not as well guided onto the turbine wheel 6. However, due to the excitation of non-vane order oscillations, the variation in the static pressure distribution 194 (or forcing function) at the leading edge of the turbine wheel 6 is still significantly reduced relative to the corresponding static pressure distribution 154 experienced with the arrangement 110 of FIG. 5A (see FIG. 9C). Again, it is thought that the increased, more bulbous leading edge 132a of these vanes 132, allows the bulk of flow 190 to better follow the suction side 132c of the vanes 132 after accelerating around the leading edge 132a.

The new arrangements 120, 130 of vanes 122, 132 shown in FIGS. 6A and 7A both have increased dimensions at the leading edge (relative to known arrangements).

The use of such a bulbous or blunt leading edge is contrary to the existing teaching in the art, which would prompt the skilled person to select a smaller radius of curvature at the leading edge or the vanes in order to achieve better separation of the flow over the vanes (in turn, increasing the efficiency of the turbine). However, the inventors of the present disclosure have realized that for a variable geometry turbine, the angle of attack of the flow of fluid over the vanes is dependent on the position of the movable wall member 12 (i.e. the VG gap). By increasing the dimensions of the vanes 122, 132 at the leading edge the arrangements 120, 130 of vanes 122, 132 shown in FIGS. 6A and 7A will operate with a relatively high efficiency over a larger range of angles of attack (and therefore, equivalently, over a larger range of positions of the movable wall member 12 or VG gaps). In addition, and perhaps of more relevance, the arrangements 120, 130 of vanes 122, 132 shown in FIGS. 6A and 7A will maintain the amplitude of the forcing function relatively low over a significantly larger range of positions of the movable wall member. In turn this reduces high cycle fatigue caused by large forcing functions.

Although the general "envelope" shape of each vane described herein can be described by a thickness distribution from the leading edge to the trailing edge, as described above, the actual thickness of the vanes is reduced relative to this thickness distribution at the leading and trailing edges by the (elliptical) end treatments. FIG. 15 shows the actual thicknesses 210, 212, 214 of the vanes 112, 122, 132 shown in FIGS. 5A, 6A and 7A respectively, as a percentage of the vane length. The actual thickness of the vanes 122 shown in FIG. 6A, as a percentage of the vane length, is given in Table 13 and the actual thickness of the vanes 132 shown in FIG. 7A, as a percentage of the vane length, is given in Table 14. It can be seen that even with the elliptical end treatments at the leading and trailing edges the new vanes 122, 132 shown in FIGS. 6A and 7A have a significantly increased thickness (relative to the vanes 112 shown in FIG. 5A) at the leading and trailing edges.

The perpendicular thickness of the new vanes 122 shown in FIG. 6A 5% along the length of the vane from the leading edge is around 60% of the maximum perpendicular thickness of the vane 122. The perpendicular thickness of the new vanes 132 shown in FIG. 7A 5% along the length of the vane from the leading edge is around 85% of the maximum perpendicular thickness of the vane 132. In contrast, the perpendicular thickness of the known vanes 112 shown in FIG. 5A 5% along the length of the vane from the leading edge is around 42% of the maximum perpendicular thickness of the vane 122. At least some increased tolerance to variation in angle of attack is expected for a vanes having a perpendicular thickness 5% along the length of the vane from the leading edge of at least 50% of the maximum perpendicular thickness of the vane.

The use of a larger, more bulbous trailing edge profile with respect to known vanes is advantageous, since it increases the foreign object damage (FOD) tolerance of the vanes.

The perpendicular thickness of the new vanes 122 shown in FIG. 6A 95% along the length of the vane from the leading edge is around 46% of the maximum perpendicular thickness of the vane 122. The perpendicular thickness of the new vanes 132 shown in FIG. 7A 95% along the length of the vane from the leading edge is around 63% of the maximum perpendicular thickness of the vane 132. In contrast, the perpendicular thickness of the known vanes 112 shown in FIG. 5A 95% along the length of the vane from the leading edge is around 26% of the maximum perpendicular thickness of the vane 122. At least some increased tolerance to FOD is expected for a vanes having a perpendicular thickness 95% along the length of the vane from the leading edge of at least 40% of the maximum perpendicular thickness of the vane.

TABLE 1

The thickness distribution of the vanes shown in FIG. 6A as a percentage along the length of the vanes (from the leading edge to the trailing edge).

| % OF VANE LENGTH | Thickness [mm] |
|---|---|
| 0 | 1.28075891 |
| 4.166666667 | 1.5142213 |
| 8.333333333 | 1.74503479 |
| 12.5 | 1.97319894 |

TABLE 1-continued

The thickness distribution of the vanes shown in FIG. 6A as a percentage along the length of the vanes (from the leading edge to the trailing edge).

| % OF VANE LENGTH | Thickness [mm] |
| --- | --- |
| 16.66666667 | 2.19389963 |
| 20.83333333 | 2.38563096 |
| 25 | 2.52329323 |
| 29.16666667 | 2.59077096 |
| 33.33333333 | 2.59465697 |
| 37.5 | 2.54315425 |
| 41.66666667 | 2.44712891 |
| 45.83333333 | 2.32423919 |
| 50 | 2.19270031 |
| 54.16666667 | 2.07016004 |
| 58.33333333 | 1.96276142 |
| 62.5 | 1.86594117 |
| 66.66666667 | 1.77472852 |
| 70.83333333 | 1.68415274 |
| 75 | 1.59020486 |
| 79.16666667 | 1.49381224 |
| 83.33333333 | 1.39748158 |
| 87.5 | 1.30364505 |
| 91.66666667 | 1.21343513 |
| 95.83333333 | 1.12688631 |
| 100 | 1.0439986 |

TABLE 2

The angular distribution of the vanes shown in FIG. 6A as a percentage along the length of the vanes (from the leading edge to the trailing edge).

| % OF VANE LENGTH | Angle Distribution in Radians |
| --- | --- |
| 0 | 0.837758 |
| 4.166666667 | 0.937494785 |
| 8.333333333 | 1.01702377 |
| 12.5 | 1.07739489 |
| 16.66666667 | 1.12068936 |
| 20.83333333 | 1.1513081 |
| 25 | 1.17393104 |
| 29.16666667 | 1.19070175 |
| 33.33333333 | 1.20151587 |
| 37.5 | 1.20631788 |
| 41.66666667 | 1.20642288 |
| 45.83333333 | 1.20398422 |
| 50 | 1.20116729 |
| 54.16666667 | 1.19985451 |
| 58.33333333 | 1.19997534 |
| 62.5 | 1.20063531 |
| 66.66666667 | 1.20101195 |
| 70.83333333 | 1.2009828 |
| 75 | 1.20080709 |
| 79.16666667 | 1.20071093 |
| 83.33333333 | 1.20071359 |
| 87.5 | 1.20076252 |
| 91.66666667 | 1.20080591 |
| 95.83333333 | 1.20081555 |
| 100 | 1.20079 |

TABLE 3

A first curve defining a portion of the shape and position of one of the vanes shown in FIG. 6A.

| x | y |
| --- | --- |
| 53.1984 | 2.48845 |
| 53.2522 | 2.44078 |
| 53.307 | 2.39646 |
| 53.3627 | 2.3556 |

TABLE 3-continued

A first curve defining a portion of the shape and position of one of the vanes shown in FIG. 6A.

| x | y |
| --- | --- |
| 53.4189 | 2.31833 |
| 53.4756 | 2.28472 |
| 53.5325 | 2.25486 |
| 53.5894 | 2.22878 |
| 53.6462 | 2.20653 |
| 53.7026 | 2.18811 |
| 53.7585 | 2.17354 |
| 53.8136 | 2.16279 |
| 53.8679 | 2.15582 |
| 53.9211 | 2.15258 |
| 53.9731 | 2.15301 |
| 54.0238 | 2.15702 |
| 54.0729 | 2.16452 |
| 54.1205 | 2.1754 |
| 54.1663 | 2.18955 |
| 54.2103 | 2.20682 |
| 54.2524 | 2.22709 |
| 54.2924 | 2.25022 |
| 54.3304 | 2.27607 |
| 54.3663 | 2.30447 |
| 54.3999 | 2.33529 |
| 54.4313 | 2.36837 |
| 54.4604 | 2.40357 |
| 54.4872 | 2.44073 |
| 54.5117 | 2.47972 |
| 54.5338 | 2.5204 |
| 54.5535 | 2.56264 |
| 54.5707 | 2.60632 |
| 54.5855 | 2.65131 |
| 54.5979 | 2.69751 |
| 54.6077 | 2.74481 |
| 54.615 | 2.79313 |
| 54.6198 | 2.84236 |
| 54.622 | 2.89244 |
| 54.6217 | 2.94329 |
| 54.6187 | 2.99484 |
| 54.6131 | 3.04701 |
| 54.6049 | 3.09976 |
| 54.5941 | 3.15303 |
| 54.5806 | 3.20674 |
| 54.5644 | 3.26084 |
| 54.5456 | 3.31528 |
| 54.5241 | 3.36997 |
| 54.5001 | 3.42487 |
| 54.4735 | 3.4799 |

TABLE 4

A second curve defining a portion of the shape and position of one of the vanes shown in FIG. 6A.

| x | y |
| --- | --- |
| 54.4735 | 3.4799 |
| 54.4619 | 3.50274 |
| 54.4464 | 3.53347 |
| 54.4271 | 3.57213 |
| 54.404 | 3.61873 |
| 54.3771 | 3.6733 |
| 54.3466 | 3.73588 |
| 54.3125 | 3.80651 |
| 54.2748 | 3.8852 |
| 54.2338 | 3.97198 |
| 54.1894 | 4.06685 |
| 54.1418 | 4.1698 |
| 54.0909 | 4.28086 |
| 54.0369 | 4.40004 |
| 53.9798 | 4.52729 |
| 53.9196 | 4.66252 |
| 53.8562 | 4.80562 |
| 53.7895 | 4.95645 |
| 53.7195 | 5.11487 |

TABLE 4-continued

A second curve defining a portion of the shape and position of one of the vanes shown in FIG. 6A.

| x | y |
|---|---|
| 53.6459 | 5.28066 |
| 53.5687 | 5.45359 |
| 53.4877 | 5.63339 |
| 53.4026 | 5.81977 |
| 53.3133 | 6.01246 |
| 53.2196 | 6.21111 |
| 53.1213 | 6.41535 |
| 53.0181 | 6.62488 |
| 52.91 | 6.83936 |
| 52.7967 | 7.0585 |
| 52.6784 | 7.28208 |
| 52.555 | 7.5099 |
| 52.4267 | 7.74179 |
| 52.2934 | 7.9775 |
| 52.155 | 8.21674 |
| 52.0117 | 8.45929 |
| 51.8634 | 8.70485 |
| 51.71 | 8.95309 |
| 51.5517 | 9.20371 |
| 51.3886 | 9.45641 |
| 51.2206 | 9.71087 |
| 51.0481 | 9.96677 |
| 50.8712 | 10.2238 |
| 50.6901 | 10.4818 |
| 50.5053 | 10.7403 |
| 50.3168 | 10.9991 |
| 50.1251 | 11.2579 |
| 49.9306 | 11.5166 |
| 49.7335 | 11.775 |
| 49.5345 | 12.0328 |
| 49.3339 | 12.29 |
| 49.132 | 12.5464 |
| 48.9292 | 12.8017 |
| 48.7256 | 13.0559 |
| 48.5214 | 13.3086 |
| 48.3167 | 13.5598 |
| 48.1117 | 13.8091 |
| 47.9064 | 14.0564 |
| 47.701 | 14.3014 |
| 47.4957 | 14.5439 |
| 47.2906 | 14.7838 |
| 47.0858 | 15.0206 |
| 46.8815 | 15.2543 |
| 46.6778 | 15.4846 |
| 46.4749 | 15.7113 |
| 46.273 | 15.934 |
| 46.0722 | 16.1528 |
| 45.8728 | 16.3672 |
| 45.6751 | 16.5774 |
| 45.4792 | 16.783 |
| 45.2856 | 16.984 |
| 45.0944 | 17.1803 |
| 44.9059 | 17.3718 |
| 44.7203 | 17.5584 |
| 44.5379 | 17.7399 |
| 44.3589 | 17.9164 |
| 44.1835 | 18.0877 |
| 44.012 | 18.2537 |
| 43.8446 | 18.4144 |
| 43.6814 | 18.5697 |
| 43.5228 | 18.7195 |
| 43.3689 | 18.8637 |
| 43.2198 | 19.0024 |
| 43.0759 | 19.1353 |
| 42.9371 | 19.2625 |
| 42.8038 | 19.384 |
| 42.6761 | 19.4996 |
| 42.5542 | 19.6093 |
| 42.4381 | 19.7131 |
| 42.3281 | 19.8109 |
| 42.2243 | 19.9028 |
| 42.1269 | 19.9886 |
| 42.0359 | 20.0683 |
| 41.9514 | 20.142 |
| 41.8737 | 20.2096 |
| 41.8027 | 20.271 |
| 41.7386 | 20.3264 |
| 41.6815 | 20.3755 |
| 41.6314 | 20.4185 |
| 41.5884 | 20.4554 |
| 41.5525 | 20.486 |
| 41.5239 | 20.5104 |
| 41.5025 | 20.5287 |
| 41.4883 | 20.5407 |

TABLE 5

A third curve defining a portion of the shape and position of one of the vanes shown in FIG. 6A.

| x | y |
|---|---|
| 41.4883 | 20.5407 |
| 41.4609 | 20.5626 |
| 41.4322 | 20.5826 |
| 41.4023 | 20.6008 |
| 41.3713 | 20.617 |
| 41.3394 | 20.6312 |
| 41.3066 | 20.6433 |
| 41.2732 | 20.6533 |
| 41.2392 | 20.6611 |
| 41.2048 | 20.6667 |
| 41.1702 | 20.6701 |
| 41.1354 | 20.6712 |
| 41.1007 | 20.6701 |
| 41.0661 | 20.6668 |
| 41.0318 | 20.6612 |
| 40.998 | 20.6535 |
| 40.9648 | 20.6436 |
| 40.9323 | 20.6315 |
| 40.9007 | 20.6174 |
| 40.87 | 20.6013 |
| 40.8404 | 20.5833 |
| 40.8121 | 20.5634 |
| 40.7851 | 20.5417 |
| 40.7595 | 20.5183 |
| 40.7355 | 20.4934 |
| 40.7131 | 20.467 |
| 40.6924 | 20.4391 |
| 40.6736 | 20.4101 |
| 40.6566 | 20.3799 |
| 40.6415 | 20.3487 |
| 40.6285 | 20.3166 |
| 40.6175 | 20.2838 |
| 40.6086 | 20.2503 |
| 40.6018 | 20.2164 |
| 40.5972 | 20.1821 |
| 40.5947 | 20.1477 |
| 40.5944 | 20.1131 |
| 40.5962 | 20.0787 |
| 40.6003 | 20.0444 |
| 40.6065 | 20.0105 |
| 40.6148 | 19.9771 |
| 40.6251 | 19.9444 |
| 40.6376 | 19.9123 |
| 40.652 | 19.8812 |
| 40.6684 | 19.851 |
| 40.6866 | 19.822 |
| 40.7067 | 19.7942 |
| 40.7284 | 19.7677 |
| 40.7518 | 19.7427 |

TABLE 6

A fourth curve defining a portion of the shape and position of one of the vanes shown in FIG. 6A.

| x | y |
|---|---|
| 40.7518 | 19.7427 |
| 40.7647 | 19.7299 |
| 40.7841 | 19.7104 |
| 40.8101 | 19.6843 |
| 40.8426 | 19.6515 |
| 40.8815 | 19.6122 |
| 40.9269 | 19.5663 |
| 40.9786 | 19.5138 |
| 41.0366 | 19.4547 |
| 41.1008 | 19.3891 |
| 41.171 | 19.317 |
| 41.2472 | 19.2383 |
| 41.3293 | 19.1532 |
| 41.4171 | 19.0617 |
| 41.5105 | 18.9637 |
| 41.6093 | 18.8594 |
| 41.7135 | 18.7487 |
| 41.8229 | 18.6317 |
| 41.9372 | 18.5085 |
| 42.0564 | 18.3791 |
| 42.1802 | 18.2436 |
| 42.3085 | 18.102 |
| 42.4411 | 17.9544 |
| 42.5777 | 17.8008 |
| 42.7183 | 17.6415 |
| 42.8626 | 17.4763 |
| 43.0104 | 17.3055 |
| 43.1615 | 17.1291 |
| 43.3156 | 16.9473 |
| 43.4727 | 16.7601 |
| 43.6325 | 16.5677 |
| 43.7947 | 16.3703 |
| 43.9593 | 16.1679 |
| 44.126 | 15.9608 |
| 44.2946 | 15.749 |
| 44.4649 | 15.5328 |
| 44.6367 | 15.3123 |
| 44.8099 | 15.0877 |
| 44.9842 | 14.8591 |
| 45.1596 | 14.6269 |
| 45.3357 | 14.391 |
| 45.5123 | 14.1517 |
| 45.6893 | 13.9091 |
| 45.8663 | 13.6634 |
| 46.043 | 13.4147 |
| 46.2194 | 13.1633 |
| 46.395 | 12.9093 |
| 46.5697 | 12.6529 |
| 46.7431 | 12.3943 |
| 46.915 | 12.1337 |
| 47.0851 | 11.8713 |
| 47.2531 | 11.6074 |
| 47.4187 | 11.342 |
| 47.5816 | 11.0755 |
| 47.7419 | 10.8082 |
| 47.8994 | 10.5402 |
| 48.0542 | 10.272 |
| 48.2064 | 10.0038 |
| 48.3563 | 9.73608 |
| 48.5041 | 9.46916 |
| 48.6499 | 9.20337 |
| 48.7939 | 8.93909 |
| 48.9362 | 8.67659 |
| 49.0772 | 8.41622 |
| 49.217 | 8.15835 |
| 49.3558 | 7.90329 |
| 49.4938 | 7.65137 |
| 49.6311 | 7.40292 |
| 49.7677 | 7.15824 |
| 49.9038 | 6.91762 |
| 50.0393 | 6.68135 |
| 50.1743 | 6.44977 |
| 50.3087 | 6.22315 |
| 50.4426 | 6.00177 |
| 50.576 | 5.78596 |
| 50.7087 | 5.57601 |
| 50.841 | 5.37217 |
| 50.9725 | 5.17462 |
| 51.103 | 4.98346 |
| 51.2322 | 4.79878 |
| 51.3599 | 4.62065 |
| 51.4858 | 4.44911 |
| 51.6096 | 4.28426 |
| 51.731 | 4.12617 |
| 51.8497 | 3.97492 |
| 51.9654 | 3.83057 |
| 52.0779 | 3.6932 |
| 52.1868 | 3.5629 |
| 52.2918 | 3.43976 |
| 52.3926 | 3.32385 |
| 52.489 | 3.21521 |
| 52.5806 | 3.11391 |
| 52.6673 | 3.02003 |
| 52.7486 | 2.93362 |
| 52.8244 | 2.8547 |
| 52.8943 | 2.78323 |
| 52.9581 | 2.7192 |
| 53.0155 | 2.66255 |
| 53.0663 | 2.61324 |
| 53.1102 | 2.57124 |
| 53.1469 | 2.53648 |
| 53.1764 | 2.50891 |
| 53.1984 | 2.48845 |

TABLE 7

The thickness distribution of the vanes shown in FIG. 7A as a percentage along the length of the vanes (from the leading edge to the trailing edge).

| % OF VANE LENGTH | Thickness [mm] |
|---|---|
| 0 | 3 |
| 4.166666671 | 2.68002698 |
| 8.333333329 | 2.47462239 |
| 12.5 | 2.32043209 |
| 16.66666671 | 2.19712996 |
| 20.83333329 | 2.09507891 |
| 25 | 2.00880635 |
| 29.16666671 | 1.93483086 |
| 33.33333329 | 1.87084379 |
| 37.5 | 1.81510879 |
| 41.66666671 | 1.76639048 |
| 45.83333329 | 1.72371248 |
| 50 | 1.68631667 |
| 54.16666671 | 1.65357658 |
| 58.33333329 | 1.62500412 |
| 62.5 | 1.60015877 |
| 66.66666671 | 1.57870697 |
| 70.83333329 | 1.56033635 |
| 75 | 1.5447882 |
| 79.16666671 | 1.53184531 |
| 83.33333329 | 1.52130155 |
| 87.5 | 1.51299153 |
| 91.66666671 | 1.50676059 |
| 95.83333329 | 1.50246962 |
| 100 | 1.5 |

TABLE 8

The angular distribution of the vanes shown in FIG. 7A as a percentage along the length of the vanes (from the leading edge to the trailing edge).

| % OF VANE LENGTH | Angle Distribution in Radians |
|---|---|
| 0 | 1.23685 |
| 4.166666665 | 1.24065031 |
| 8.333333354 | 1.2418039 |
| 12.5 | 1.24031078 |
| 16.66666665 | 1.23617095 |
| 20.83333335 | 1.22938441 |
| 25 | 1.21999442 |
| 29.16666665 | 1.2087142 |
| 33.33333335 | 1.19678444 |
| 37.5 | 1.18546009 |
| 41.66666665 | 1.17599611 |
| 45.83333335 | 1.16964102 |
| 50 | 1.16687287 |
| 54.16666665 | 1.16667795 |
| 58.33333335 | 1.1678718 |
| 62.5 | 1.16926995 |
| 66.66666646 | 1.16998859 |
| 70.83333354 | 1.16978665 |
| 75 | 1.16938817 |
| 79.16666646 | 1.1690462 |
| 83.33333354 | 1.16883979 |
| 87.5 | 1.16876897 |
| 91.66666646 | 1.16883374 |
| 95.83333354 | 1.16903408 |
| 100 | 1.16937 |

TABLE 9

A first curve defining a portion of the shape and position of one of the vanes shown in FIG. 7A.

| x | y |
|---|---|
| 48.9619 | 2.1136 |
| 49.0142 | 1.95703 |
| 49.0721 | 1.80154 |
| 49.1351 | 1.6479 |
| 49.2031 | 1.49689 |
| 49.2756 | 1.34926 |
| 49.3524 | 1.20576 |
| 49.4331 | 1.06711 |
| 49.5174 | 0.934032 |
| 49.6048 | 0.807213 |
| 49.6949 | 0.687327 |
| 49.7874 | 0.575004 |
| 49.8818 | 0.470845 |
| 49.9776 | 0.375414 |
| 50.0745 | 0.289204 |
| 50.172 | 0.212652 |
| 50.2696 | 0.146146 |
| 50.3668 | 0.090032 |
| 50.4633 | 0.044607 |
| 50.5586 | 0.010121 |
| 50.6521 | −0.01323 |
| 50.7434 | −0.02529 |
| 50.8322 | −0.02598 |
| 50.9178 | −0.01524 |
| 51 | 0.006897 |
| 51.0782 | 0.040369 |
| 51.152 | 0.085049 |
| 51.2211 | 0.140753 |
| 51.285 | 0.207243 |
| 51.3435 | 0.284223 |
| 51.396 | 0.371344 |
| 51.4424 | 0.4682 |
| 51.4823 | 0.574333 |
| 51.5155 | 0.689234 |
| 51.5417 | 0.812344 |
| 51.5609 | 0.943054 |
| 51.5727 | 1.08072 |

TABLE 9-continued

A first curve defining a portion of the shape and position of one of the vanes shown in FIG. 7A.

| x | y |
|---|---|
| 51.5771 | 1.22465 |
| 51.574 | 1.37414 |
| 51.5634 | 1.5284 |
| 51.5452 | 1.68662 |
| 51.5196 | 1.84793 |
| 51.4866 | 2.01144 |
| 51.4464 | 2.17623 |
| 51.3992 | 2.34138 |
| 51.3451 | 2.50594 |
| 51.2846 | 2.66899 |
| 51.2179 | 2.8296 |
| 51.1454 | 2.98686 |

TABLE 10

A second curve defining a portion of the shape and position of one of the vanes shown in FIG. 7A.

| x | y |
|---|---|
| 51.1454 | 2.98686 |
| 51.1307 | 3.017 |
| 51.1128 | 3.05392 |
| 51.0916 | 3.09755 |
| 51.0671 | 3.14786 |
| 51.0393 | 3.2048 |
| 51.0084 | 3.26832 |
| 50.9742 | 3.33836 |
| 50.9368 | 3.41486 |
| 50.8962 | 3.49773 |
| 50.8525 | 3.58692 |
| 50.8056 | 3.68232 |
| 50.7556 | 3.78385 |
| 50.7024 | 3.8914 |
| 50.6461 | 4.00487 |
| 50.5866 | 4.12413 |
| 50.524 | 4.24907 |
| 50.4584 | 4.37957 |
| 50.3896 | 4.51548 |
| 50.3176 | 4.65667 |
| 50.2426 | 4.80298 |
| 50.1645 | 4.95427 |
| 50.0832 | 5.11038 |
| 49.9989 | 5.27113 |
| 49.9114 | 5.43635 |
| 49.8207 | 5.60586 |
| 49.727 | 5.77948 |
| 49.6301 | 5.95699 |
| 49.53 | 6.13818 |
| 49.4268 | 6.32286 |
| 49.3204 | 6.51081 |
| 49.211 | 6.70181 |
| 49.0984 | 6.8956 |
| 48.9827 | 7.09199 |
| 48.864 | 7.29073 |
| 48.7422 | 7.49157 |
| 48.6175 | 7.69429 |
| 48.4899 | 7.89864 |
| 48.3595 | 8.10438 |
| 48.2264 | 8.3113 |
| 48.0906 | 8.51917 |
| 47.9524 | 8.72776 |
| 47.8117 | 8.93685 |
| 47.6689 | 9.14623 |
| 47.524 | 9.35568 |
| 47.3772 | 9.56504 |
| 47.2287 | 9.77411 |
| 47.0788 | 9.98273 |
| 46.9276 | 10.1908 |
| 46.7753 | 10.3981 |
| 46.622 | 10.6046 |
| 46.468 | 10.8102 |

TABLE 10-continued

A second curve defining a portion of the shape and position of one of the vanes shown in FIG. 7A.

| x | y |
|---|---|
| 46.3134 | 11.0147 |
| 46.1584 | 11.2181 |
| 46.003 | 11.4202 |
| 45.8475 | 11.6209 |
| 45.692 | 11.82 |
| 45.5366 | 12.0175 |
| 45.3814 | 12.2131 |
| 45.2266 | 12.4068 |
| 45.0723 | 12.5983 |
| 44.9185 | 12.7875 |
| 44.7656 | 12.9743 |
| 44.6135 | 13.1585 |
| 44.4624 | 13.34 |
| 44.3125 | 13.5184 |
| 44.1639 | 13.6939 |
| 44.0168 | 13.8661 |
| 43.8714 | 14.0349 |
| 43.7277 | 14.2003 |
| 43.5861 | 14.3621 |
| 43.4466 | 14.5201 |
| 43.3093 | 14.6744 |
| 43.1745 | 14.8247 |
| 43.0424 | 14.971 |
| 42.9129 | 15.1132 |
| 42.7864 | 15.2512 |
| 42.663 | 15.385 |
| 42.5427 | 15.5144 |
| 42.4258 | 15.6393 |
| 42.3124 | 15.7598 |
| 42.2026 | 15.8757 |
| 42.0966 | 15.987 |
| 41.9945 | 16.0935 |
| 41.8963 | 16.1954 |
| 41.8024 | 16.2924 |
| 41.7126 | 16.3846 |
| 41.6272 | 16.4719 |
| 41.5463 | 16.5542 |
| 41.4699 | 16.6316 |
| 41.3982 | 16.704 |
| 41.3313 | 16.7713 |
| 41.2692 | 16.8335 |
| 41.212 | 16.8906 |
| 41.1598 | 16.9426 |
| 41.1126 | 16.9895 |
| 41.0706 | 17.0311 |
| 41.0337 | 17.0676 |
| 41.002 | 17.0989 |
| 40.9756 | 17.1249 |
| 40.9545 | 17.1457 |
| 40.9386 | 17.1613 |
| 40.9282 | 17.1716 |

TABLE 11

A third curve defining a portion of the shape and position of one of the vanes shown in FIG. 7A.

| x | y |
|---|---|
| 40.9282 | 17.1716 |
| 40.8915 | 17.2053 |
| 40.8527 | 17.2366 |
| 40.8119 | 17.2653 |
| 40.7694 | 17.2912 |
| 40.7254 | 17.3143 |
| 40.6799 | 17.3344 |
| 40.6333 | 17.3515 |
| 40.5857 | 17.3654 |
| 40.5374 | 17.3762 |
| 40.4885 | 17.3837 |
| 40.4393 | 17.388 |
| 40.39 | 17.389 |
| 40.3407 | 17.3868 |
| 40.2918 | 17.3812 |
| 40.2434 | 17.3724 |
| 40.1958 | 17.3605 |
| 40.149 | 17.3454 |
| 40.1034 | 17.3272 |
| 40.0591 | 17.3061 |
| 40.0163 | 17.282 |
| 39.9752 | 17.2552 |
| 39.936 | 17.2258 |
| 39.8987 | 17.1938 |
| 39.8637 | 17.1594 |
| 39.8309 | 17.1229 |
| 39.8006 | 17.0842 |
| 39.7729 | 17.0437 |
| 39.7479 | 17.0015 |
| 39.7256 | 16.9577 |
| 39.7062 | 16.9126 |
| 39.6897 | 16.8664 |
| 39.6762 | 16.8192 |
| 39.6658 | 16.7713 |
| 39.6585 | 16.7229 |
| 39.6543 | 16.6742 |
| 39.6532 | 16.6253 |
| 39.6553 | 16.5765 |
| 39.6605 | 16.528 |
| 39.6688 | 16.48 |
| 39.6802 | 16.4327 |
| 39.6946 | 16.3863 |
| 39.7119 | 16.341 |
| 39.7322 | 16.297 |
| 39.7552 | 16.2544 |
| 39.7809 | 16.2134 |
| 39.8093 | 16.1743 |
| 39.8401 | 16.137 |
| 39.8733 | 16.1019 |

TABLE 12

A fourth curve defining a portion of the shape and position of one of the vanes shown in FIG. 7A.

| x | y |
|---|---|
| 39.8733 | 16.1019 |
| 39.8835 | 16.0919 |
| 39.8988 | 16.0767 |
| 39.9192 | 16.0565 |
| 39.9447 | 16.0312 |
| 39.9752 | 16.0007 |
| 40.0108 | 15.9652 |
| 40.0514 | 15.9246 |
| 40.0969 | 15.879 |
| 40.1472 | 15.8284 |
| 40.2024 | 15.7727 |
| 40.2623 | 15.7121 |
| 40.3268 | 15.6464 |
| 40.3958 | 15.5759 |
| 40.4694 | 15.5004 |
| 40.5473 | 15.4201 |
| 40.6294 | 15.3349 |
| 40.7158 | 15.245 |
| 40.8061 | 15.1502 |
| 40.9004 | 15.0508 |
| 40.9985 | 14.9466 |
| 41.1003 | 14.8379 |
| 41.2056 | 14.7246 |
| 41.3143 | 14.6067 |
| 41.4262 | 14.4845 |
| 41.5413 | 14.3578 |
| 41.6594 | 14.2269 |
| 41.7803 | 14.0916 |

TABLE 12-continued

A fourth curve defining a portion of the shape and position of one of the vanes shown in FIG. 7A.

| x | y |
| --- | --- |
| 41.9038 | 13.9523 |
| 42.0299 | 13.8088 |
| 42.1583 | 13.6613 |
| 42.2889 | 13.5099 |
| 42.4216 | 13.3547 |
| 42.5561 | 13.1958 |
| 42.6923 | 13.0333 |
| 42.8301 | 12.8672 |
| 42.9693 | 12.6977 |
| 43.1097 | 12.5249 |
| 43.2512 | 12.3489 |
| 43.3937 | 12.1699 |
| 43.537 | 11.9879 |
| 43.6809 | 11.8032 |
| 43.8253 | 11.6157 |
| 43.9701 | 11.4259 |
| 44.1152 | 11.2336 |
| 44.2603 | 11.0392 |
| 44.4053 | 10.8429 |
| 44.55 | 10.6447 |
| 44.6944 | 10.445 |
| 44.8381 | 10.2438 |
| 44.981 | 10.0414 |
| 45.123 | 9.83784 |
| 45.2637 | 9.63342 |
| 45.4031 | 9.42827 |
| 45.541 | 9.2226 |
| 45.677 | 9.01653 |
| 45.8111 | 8.81026 |
| 45.9431 | 8.60395 |
| 46.0727 | 8.39773 |
| 46.2 | 8.19172 |
| 46.3246 | 7.98611 |
| 46.4466 | 7.78102 |
| 46.5658 | 7.57663 |
| 46.6822 | 7.37311 |
| 46.7956 | 7.17063 |
| 46.9062 | 6.96939 |
| 47.0136 | 6.76958 |
| 47.1181 | 6.5714 |
| 47.2195 | 6.37503 |
| 47.3177 | 6.18069 |
| 47.4129 | 5.98856 |
| 47.505 | 5.79885 |
| 47.5941 | 5.61178 |
| 47.68 | 5.42754 |
| 47.7629 | 5.24633 |
| 47.8428 | 5.06835 |
| 47.9196 | 4.89382 |
| 47.9935 | 4.72293 |
| 48.0644 | 4.55587 |
| 48.1323 | 4.39282 |
| 48.1974 | 4.23399 |
| 48.2596 | 4.07955 |
| 48.3189 | 3.92968 |
| 48.3755 | 3.78456 |
| 48.4292 | 3.64435 |
| 48.4803 | 3.50922 |
| 48.5286 | 3.37932 |
| 48.5743 | 3.25481 |
| 48.6173 | 3.13582 |
| 48.6577 | 3.02248 |
| 48.6956 | 2.91494 |
| 48.7309 | 2.8133 |
| 48.7638 | 2.71769 |
| 48.7941 | 2.62821 |
| 48.8221 | 2.54497 |
| 48.8476 | 2.46806 |
| 48.8708 | 2.39757 |
| 48.8916 | 2.33358 |
| 48.9102 | 2.27618 |
| 48.9264 | 2.22542 |
| 48.9405 | 2.18136 |
| 48.9523 | 2.14407 |
| 48.9619 | 2.1136 |

TABLE 13

The actual thickness of the vanes shown in FIG. 6A as a percentage along the length of the vanes (from the leading edge to the trailing edge), including the leading and trailing edges by the (elliptical) end treatments.

| % OF VANE LENGTH | Thickness [mm] |
| --- | --- |
| 0 | 0 |
| 0.564971751 | 0.6497 |
| 1.129943503 | 0.8973 |
| 1.694915254 | 1.0733 |
| 2.259887006 | 1.2093 |
| 2.824858757 | 1.3182 |
| 3.389830508 | 1.4066 |
| 4.166666667 | 1.5142213 |
| 5.875706215 | 1.6152 |
| 8.333333333 | 1.74503479 |
| 12.5 | 1.97319894 |
| 16.66666667 | 2.19389963 |
| 20.83333333 | 2.38563096 |
| 25 | 2.52329323 |
| 29.16666667 | 2.59077096 |
| 33.33333333 | 2.59465697 |
| 37.5 | 2.54315425 |
| 41.66666667 | 2.44712891 |
| 45.83333333 | 2.32423919 |
| 50 | 2.19270031 |
| 54.16666667 | 2.07016004 |
| 58.33333333 | 1.96276142 |
| 62.5 | 1.86594117 |
| 66.66666667 | 1.77472852 |
| 70.83333333 | 1.68415274 |
| 75 | 1.59020486 |
| 79.16666667 | 1.49381224 |
| 83.33333333 | 1.39748158 |
| 87.5 | 1.30364505 |
| 91.66666667 | 1.21343513 |
| 95.83333333 | 1.12688631 |
| 97.64124294 | 1.0859 |
| 98.20621469 | 1.0381 |
| 98.77118644 | 0.9052 |
| 99.33615819 | 0.6331 |
| 100 | 0 |

TABLE 14

The actual thickness of the vanes shown in FIG. 7A as a percentage along the length of the vanes (from the leading edge to the trailing edge), including the leading and trailing edges by the (elliptical) end treatments.

| % OF VANE LENGTH | Thickness [mm] |
| --- | --- |
| 0 | 0 |
| 0.657894737 | 0.7981 |
| 1.315789474 | 1.1109 |
| 1.973684211 | 1.3399 |
| 2.631578947 | 1.5237 |
| 3.289473684 | 1.6767 |
| 3.947368421 | 1.8068 |
| 5.263157895 | 2.0145 |
| 6.578947368 | 2.1675 |

TABLE 14-continued

The actual thickness of the vanes shown in FIG. 7A as a percentage along the length of the vanes (from the leading edge to the trailing edge), including the leading and trailing edges by the (elliptical) end treatments.

| % OF VANE LENGTH | Thickness [mm] |
|---|---|
| 7.894736842 | 2.2759 |
| 9.210526316 | 2.3443 |
| 10.52631579 | 2.3747 |
| 11.65657895 | 2.3516 |
| 12.5 | 2.32043209 |
| 16.66666671 | 2.19712996 |
| 20.83333329 | 2.09507891 |
| 25 | 2.00880635 |
| 29.16666671 | 1.93483086 |
| 33.33333329 | 1.87084379 |
| 37.5 | 1.81510879 |
| 41.66666671 | 1.76639048 |
| 45.83333329 | 1.72371248 |
| 50 | 1.68631667 |
| 54.16666671 | 1.65357658 |
| 58.33333329 | 1.62500412 |
| 62.5 | 1.60015877 |
| 66.66666671 | 1.57870697 |
| 70.83333329 | 1.56033635 |
| 75 | 1.5447882 |
| 79.16666671 | 1.53184531 |
| 83.33333329 | 1.52130155 |
| 87.5 | 1.51299153 |
| 91.66666671 | 1.50676059 |
| 95.83333329 | 1.50246962 |
| 97.36842105 | 1.4933 |
| 98.02631579 | 1.442 |
| 98.68421053 | 1.3395 |
| 99.34210526 | 1.1708 |
| 100 | 0 |

While specific embodiments of the disclosure have been described above, it will be appreciated that the disclosure may be practiced otherwise than as described. The descriptions above are intended to be illustrative, not limiting. Thus it will be apparent to one skilled in the art that modifications may be made to the disclosure as described without departing from the scope of the claims set out below.

The invention claimed is:

1. A variable geometry turbine comprising:
a turbine housing defining an inlet and an outlet;
a turbine wheel rotatably mounted in the turbine housing between the inlet and the outlet such that the turbine wheel can rotate about an axis;
a movable wall member mounted in the housing so as to be movable relative to the housing between at least a first position and a second position, the movable wall member partially defining an inlet passageway between the inlet and the turbine wheel, the inlet passageway being radially outboard of the turbine wheel, a dimension of the inlet passageway being dependent on a position of the movable wall member relative to the housing; and
a plurality of vanes extending across the inlet passageway, the vanes being circumferentially spaced;
wherein in cross section each of the vanes has an elongate shape extending from a leading edge which is closer to the inlet to a trailing edge which is closer to the turbine wheel and wherein a perpendicular thickness of the vane 5% along a length of the vane from the leading edge is at least 50% of a maximum perpendicular thickness of the vane; and
wherein the vanes are arranged so as to produce a double wake variation in a static pressure around a circumference of the turbine wheel.

2. The variable geometry turbine of claim 1 wherein a perpendicular thickness of the vane 95% along the length of the vane from the leading edge is at least 40% of the maximum perpendicular thickness of the vane.

3. The variable geometry turbine of claim 1 wherein the leading edge of the vanes is provided with an elliptical end treatment having a ratio of a major axis to a minor axis of at least 1.5.

4. The variable geometry turbine of claim 1 wherein the vanes have a shape at least partially defined by a thickness distribution that exponentially reduces from the leading edge to the trailing edge and having an end treatment at each of the leading and trailing edges.

5. The variable geometry turbine of claim 1 wherein the vanes have a shape at least partially defined by an angular distribution that is more tangential at the leading edge than the trailing edge.

6. A movable wall member for use in the variable geometry turbine of claim 1.

7. A method for designing vanes for the variable geometry turbine of claim 1, the method comprising:
selecting a thickness distribution; and
applying an edge treatment to each of a leading edge and a trailing edge, the edge treatment for the leading edge being elliptical in cross-section, having a ratio between a minor length and a major length of 1.5 or more;
wherein a perpendicular thickness of a resultant vane 5% along the length of the vane from the leading edge is at least 50% of a maximum perpendicular thickness of the vane.

8. The method of claim 7 wherein the selection of the thickness distribution and the application of the edge treatment to each of the leading edge and trailing edge is such that a perpendicular thickness of the resultant vane 95% along the length of the vane from the leading edge is at least 40% of the maximum perpendicular thickness of the vane.

9. A method for designing vanes for the variable geometry turbine of claim 1, the method comprising:
selecting a thickness distribution of the vanes to provide a rapid reduction in vane thickness between the leading and trailing edges.

10. The method of claim 9 further comprising: selecting an angular distribution of the vanes wherein the angular distribution is more tangential at the leading edge than at the trailing edge.

11. A variable geometry turbine comprising:
a turbine housing defining an inlet and an outlet;
a turbine wheel rotatably mounted in the turbine housing between the inlet and the outlet such that the turbine wheel can rotate about an axis;
a movable wall member mounted in the housing so as to be movable relative to the housing between at least a first position and a second position, the movable wall member partially defining an inlet passageway between the inlet and the turbine wheel, the inlet passageway being radially outboard of the turbine wheel, a dimension of the inlet passageway being dependent on a position of the movable wall member relative to the housing; and
a plurality of vanes extending across the inlet passageway, the vanes being circumferentially spaced;
wherein in cross section each of the vanes has an elongate shape extending from a leading edge which is closer to the inlet to a trailing edge which is closer to the turbine wheel and wherein the vanes are arranged so as to produce a double wake variation in a static pressure around a circumference of the turbine wheel.

12. The variable geometry turbine of claim 11 wherein the vanes have a shape at least partially defined by a thickness distribution that exponentially reduces from the leading edge to the trailing edge and having an end treatment at each of the leading and trailing edges.

13. The variable geometry turbine of claim 11 wherein the vanes have a shape at least partially defined by an angular distribution that is more tangential at the leading edge than the trailing edge.

14. A variable geometry turbine comprising:
a turbine housing defining an inlet and an outlet;
a turbine wheel rotatably mounted in the turbine housing between the inlet and the outlet such that the turbine wheel can rotate about an axis;
a movable wall member mounted in the housing so as to be movable relative to the housing between at least a first position and a second position, the movable wall member partially defining an inlet passageway between the inlet and the turbine wheel, the inlet passageway being radially outboard of the turbine wheel, a dimension of the inlet passageway being dependent on a position of the movable wall member relative to the housing; and
a plurality of vanes extending across the inlet passageway, the vanes being circumferentially spaced;
wherein in cross section each of the vanes has an elongate shape extending from a leading edge which is closer to the inlet to a trailing edge which is closer to the turbine wheel and wherein the vanes have a shape at least partially defined by a thickness distribution that exponentially reduces from the leading edge to the trailing edge and having an end treatment at each of the leading and trailing edges.

15. The variable geometry turbine of claim 14 wherein the thickness distribution is the thickness distribution in Table 7.

16. The variable geometry turbine of claim 15 wherein an actual thickness of the vanes, with the end treatment at each of the leading and trailing edges, is the thickness distribution in Table 14.

17. The variable geometry turbine of claim 14 wherein the vanes have a shape at least partially defined by an angular distribution that is more tangential at the leading edge than the trailing edge.

18. The variable geometry turbine of claim 17 wherein the angular distribution is the angular distribution in Table 8.

19. A variable geometry turbine comprising:
a turbine housing defining an inlet and an outlet;
a turbine wheel rotatably mounted in the turbine housing between the inlet and the outlet such that the turbine wheel can rotate about an axis;
a movable wall member mounted in the housing so as to be movable relative to the housing between at least a first position and a second position, the movable wall member partially defining an inlet passageway between the inlet and the turbine wheel, the inlet passageway being radially outboard of the turbine wheel, a dimension of the inlet passageway being dependent on a position of the movable wall member relative to the housing; and
a plurality of vanes extending across the inlet passageway, the vanes being circumferentially spaced;
wherein in cross section each of the vanes has an elongate shape extending from a leading edge which is closer to the inlet to a trailing edge which is closer to the turbine wheel, and wherein the vanes have a shape defined by the curves in Tables 9, 10, 11 and 12 multiplied by a scale factor.

* * * * *